United States Patent [19]
Ooka et al.

[11] Patent Number: 5,562,406
[45] Date of Patent: Oct. 8, 1996

[54] SEAL ASSEMBLY FOR FLUID PUMPS AND METHOD FOR DETECTING LEAKS IN FLUID PUMPS OR FLUID CONTAINMENT DEVICES

[75] Inventors: Kazuo Ooka, Morton Grove; Manfred P. Klein, Highland Park; Vijay Sivanesan, Downers Grove; Jeff S. Brown, Palatine, all of Ill.

[73] Assignee: Ansimag Inc., Elk Grove Village, Ill.

[21] Appl. No.: 371,381

[22] Filed: Jan. 11, 1995

[51] Int. Cl.[6] .................................. F04D 29/12
[52] U.S. Cl. .................. 415/112; 415/113; 415/118; 415/168.2; 415/111; 415/230; 415/231; 277/2; 277/18; 277/21; 277/59; 417/63; 417/420; 417/423.11
[58] Field of Search ................ 415/111, 112, 415/113, 118, 168.2, 180, 230, 231; 417/420, 423.11, 63; 277/2, 15, 17, 21, 18, 59, 63, 79, 47, 152; 73/46, 49.8

[56] References Cited

U.S. PATENT DOCUMENTS

| | | |
|---|---|---|
| 2,612,390 | 9/1952 | Lewis .................................. 277/21 |
| 3,589,737 | 6/1971 | Sedy ................................... 277/17 |
| 3,762,724 | 10/1973 | Porter ................................. 277/21 |
| 3,954,348 | 5/1976 | Renaud ............................... 415/113 |
| 4,036,505 | 7/1977 | Floyd et al. . | 
| 4,648,808 | 3/1987 | Havenstein ......................... 417/420 |
| 4,664,392 | 5/1987 | Hatch ................................. 277/152 |
| 4,762,461 | 8/1988 | Ushikoshi .......................... 415/118 |
| 4,854,823 | 8/1989 | Hatting et al. ..................... 417/423.11 |
| 5,066,200 | 11/1991 | Ooka . | |
| 5,249,812 | 10/1993 | Volden et al. . | |
| 5,263,361 | 11/1993 | Gates . | |
| 5,306,124 | 4/1994 | Back . | |
| 5,308,287 | 5/1994 | Gunsing . | |
| 5,310,372 | 5/1994 | Tibbetts . | |
| 5,340,272 | 8/1994 | Fehlau . | |
| 5,340,273 | 8/1994 | Rockwood . | |
| 5,345,812 | 9/1994 | Haboian . | |

FOREIGN PATENT DOCUMENTS

| | | | |
|---|---|---|---|
| 4209043 | 1/1993 | Germany | 277/152 |
| 0030975 | 2/1989 | Japan | 277/47 |
| 0129546 | 5/1994 | Japan | 277/47 |

OTHER PUBLICATIONS

American Petroleum Institute Standard 610: Centrifugal Pumps for General Refinery Service, 7th Ed. (Feb. 1989) FIGS. D–2&D–3.

Hydraulic Institute, Sealless Centrifugal Pump Standards, First Ed. Dec. 18, 1992 (HI 5.1–5.6), pp. 27 & 29.

*Primary Examiner*—Edward K. Look
*Assistant Examiner*—Christopher Verdier
*Attorney, Agent, or Firm*—Darin E. Bartholomew

[57] ABSTRACT

The seal assembly comprises a housing, a shaft, seals, and a reservoir. The housing has a hollow section bounded by a cylindrical surface and a first curved protrusion. The housing has a first channel and a second channel extending from the hollow section. The shaft extends through the hollow section. Seals seal the hollow section with respect to the shaft to form a chamber. The combination of the first curved protrusion and the sleeve cooperatively form a hydraulic pump for conveying a lubricating fluid from the chamber via the first channel to reservoir. The lubricating fluid is circulated from the reservoir to the chamber via a second channel. The seal assembly has a fluid level gauge or an optoelectronic leak detector for detecting leaks in the seals of the seal assembly or leaks in a fluid pump (i.e. a magnetic-drive centrifugal pump) coupled to the seal assembly.

55 Claims, 17 Drawing Sheets

SEAL ASSEMBLY FOR FLUID PUMPS AND METHOD FOR DETECTING LEAKS IN FLUID PUMPS OR FLUID CONTAINMENT DEVICES

BACKGROUND ART

The present invention relates generally to a seal assembly for a fluid pump, and to a method for detecting leaks in the fluid pump or the seal assembly. In particular, the present invention relates to a seal assembly for use in a magnetic-drive centrifugal pump, and a method for detecting leaks in the containment shell of a magnetic-drive centrifugal pump.

Background art fluid pumps may externally leak pumped fluids upon the failure of a fluid containment device or a seal. Because pumped fluids may contain caustic, hazardous, toxic, or flammable chemicals, the external leaking of pumped fluids from fluid pumps may lead to dangerous conditions for workers in industrial processing plants. The prompt identification and remedying of pumped fluid leaks minimizes environmental and safety dangers.

The containment of hazardous fluids depends on the integrity of fluid containment devices, such as seals, containment shells, gaskets, mechanical seals, packing, or the like. Containment devices may leak spontaneously because of flow rates and head values which significantly vary from optimum pump operating conditions (i.e. best efficiency point) or from the pump manufacturer's recommended operating conditions. For example, if a pump is operated at a excess capacity, or where the flow rate is greater than recommended at a corresponding head, the pump will surge and vibrate causing potential shaft seal problems. Similarly, if a pump is operated at reduced capacity, potential seal problems are caused by increased radial thrust of the shaft and increased vibration.

Fluid containment devices may fail because of a prodigious variety of environmental factors. In particular, pressure and temperature changes in the pumped fluid may contribute to the failure of fluid containment devices. For instance, pump seals or containment shells may fail because an industrial worker manually adjusts a valve, which results in a sudden pressure shift at the pump. Likewise, pump seals or containment shells may fail because of disruptive or abrupt flow rate changes initiated by automatic controllers. In manufacturing processes, where storage vessels are coupled to pumps, damaging pressure changes may be caused by level changes of fluids stored in the storage vessels.

Temperature changes may be caused by the ineffective operation of heat exchangers coupled to the pump or ambient temperature changes. Excessive heat can cause gasket and seal materials, such as elastomers, to become brittle and inflexible, so that sealing efficiency is degraded. In addition, heat can cause thermal distortion of gasket materials and elastomers so that sealing efficiency is degraded.

Problems with containment devices in centrifugal sealless pumps are particularly intractable because the thickness and resultant strength of the containment shell are restricted by the inherent design of the centrifugal sealless pump. Centrifugal sealless pumps include two varieties: canned sealless centrifugal pumps and magnetic-drive sealless centrifugal pumps. In a canned sealless centrifugal pump, metallic containment shells are deliberately kept thin to reduce electrical eddy currents and corresponding thermal problems. Even where nonmetallic containment shells are used the thickness of the containment shell is limited by the requisite proximity for efficient magnetic field interaction of the stator and the rotor.

In magnetic-drive sealless centrifugal pumps, a first magnet is coupled to a second magnet (or a torque ring) through a thin containment shell. In magnetic-drive pumps, the containment shell generally has a thickness not exceeding three millimeters. The containment shell is typically spaced less than one millimeter from the first magnet and less than one millimeter from the second magnet. Nonmetallic containment shells have a thickness limited by the requisite proximity for efficient magnetic coupling of the first magnet and the second magnet. Consequently, the relatively thin containment shell may be corroded or damaged due to the chemical, thermal, or caustic attributes of the pumped fluid. In addition, the containment shell may be damaged by pressure surges occurring, for example, when a user opens or closes a valve in pipes coupled to the fluid pump.

To determine the integrity of fluid containment devices, users of pumps typically disassemble pumps and inspect fluid containment devices at regular time intervals. However, a containment device can fail virtually instantaneously; and even immediately after the soundness of the fluid containment device was previously verified. Hence, identifying the failure of sealing devices by disassembly of pumps, is time-consuming and impractical.

Therefore, a need exists for a seal assembly that can readily verify the integrity of the seal assembly or containment shell of a fluid pump without disassembly of the fluid pump. In addition, the need exists for a centrifugal pump which can offer additional reliability, improved hazardous pumped fluid containment, and reduced pumped fluid emissions compared to background art pumps.

SUMMARY OF THE INVENTION

The seal assembly comprises a housing, a shaft, seals, and a reservoir. The housing has a hollow section with its boundaries defined by a cylindrical surface and a first curved protrusion. The housing has a first channel and a second channel extending from the hollow section. The hollow section coaxially receives the shaft. The shaft may have, but need not have, a sleeve coaxially oriented about the shaft. Seals seal the hollow section with respect to the shaft, or the sleeve, to form a chamber. The combination of the first curved protrusion and the sleeve cooperatively form a hydraulic pump for conveying a lubricating fluid from the chamber via the first channel to the reservoir. The lubricating fluid is circulated from the reservoir to the chamber via the second channel.

In a preferred embodiment, the reservoir has a fluid level gauge so that a user can readily observe the level of fluid in the reservoir and confirm the integrity of the seals, or another fluid containment device. For example, if the seal assembly is coupled to a magnetic-drive centrifugal pump's casing, the level of fluid in the reservoir may indicate whether or not the magnetic-drive pump's containment shell is leaking. The seal assembly provides containment of spurious pumped fluid if the containment shell or the pump seals should fail.

In one embodiment of the seal assembly, the reservoir has an optoelectronic leak detector which determines if the seal assembly or a fluid pump to which the seal assembly is coupled leaks. The optoelectronic leak detector functions by monitoring fluid level changes in the reservoir. The optoelectronic leak detector may automatically shut off the fluid pump, or trigger an alarm, if the seal assembly or a fluid containment device (i.e. containment shell) has failed. Moreover, the seal assembly and method for detecting leaks in fluid pumps, fluid containment devices, or seals allows the user to instantaneously verify the integrity of the containment shell or seal.

DETAILED DESCRIPTION

In the context of the specification and the claims, fluid shall refer broadly to liquids, gases, solids, mixtures of liquids and gases, mixtures of liquids and solids, or the like.

The seal assembly may be arranged as an upgrade kit for field installation or field modification on a wide variety of centrifugal pumps. In addition, the seal assembly may be incorporated into newly manufactured centrifugal pumps. For example, the seal assembly may be coupled to a magnetic-drive sealless centrifugal pump between the drive motor and the pump (i.e. wet end). The seal assembly and method for detecting leaks in fluid containment devices can also function as a test fixture to determine the breakage and reliability of seals and fluid containment devices.

Figure 1:
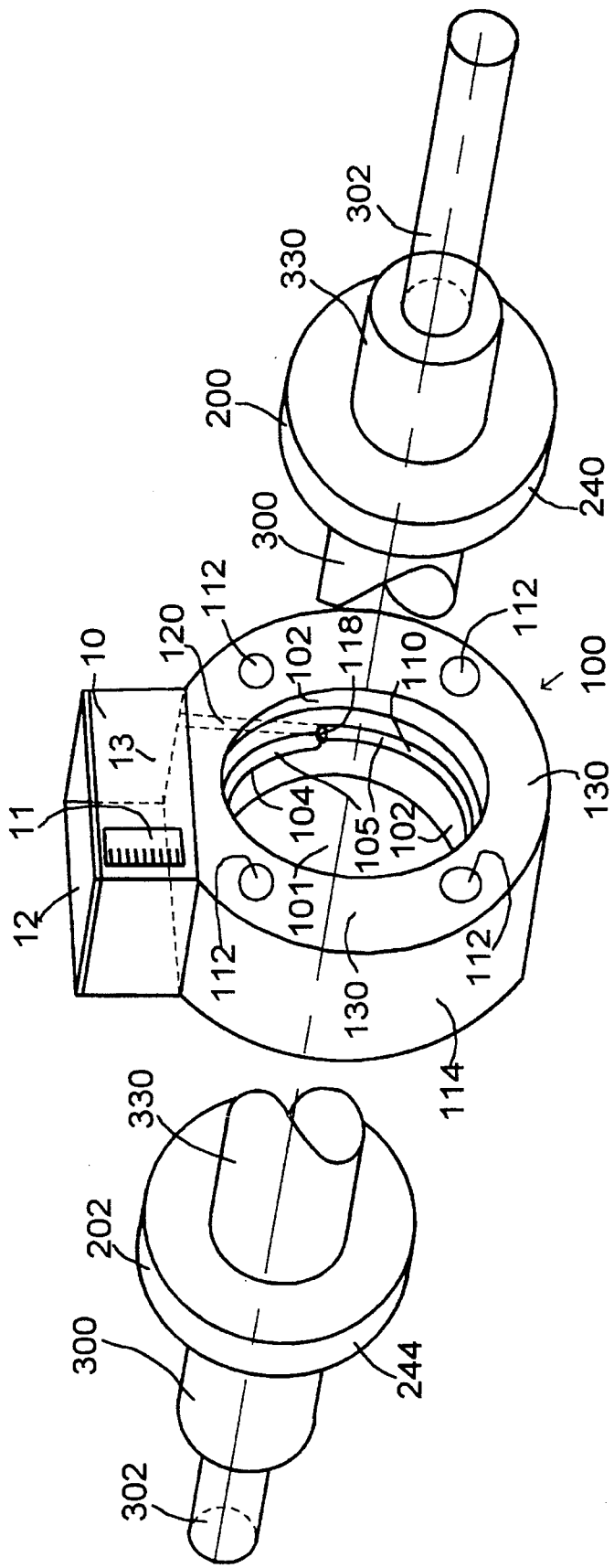
FIG. 1 illustrates a perspective view of a preferred embodiment of the seal assembly with the shaft broken and spaced apart to better illustrate the hollow section of the housing.
Figure 2:
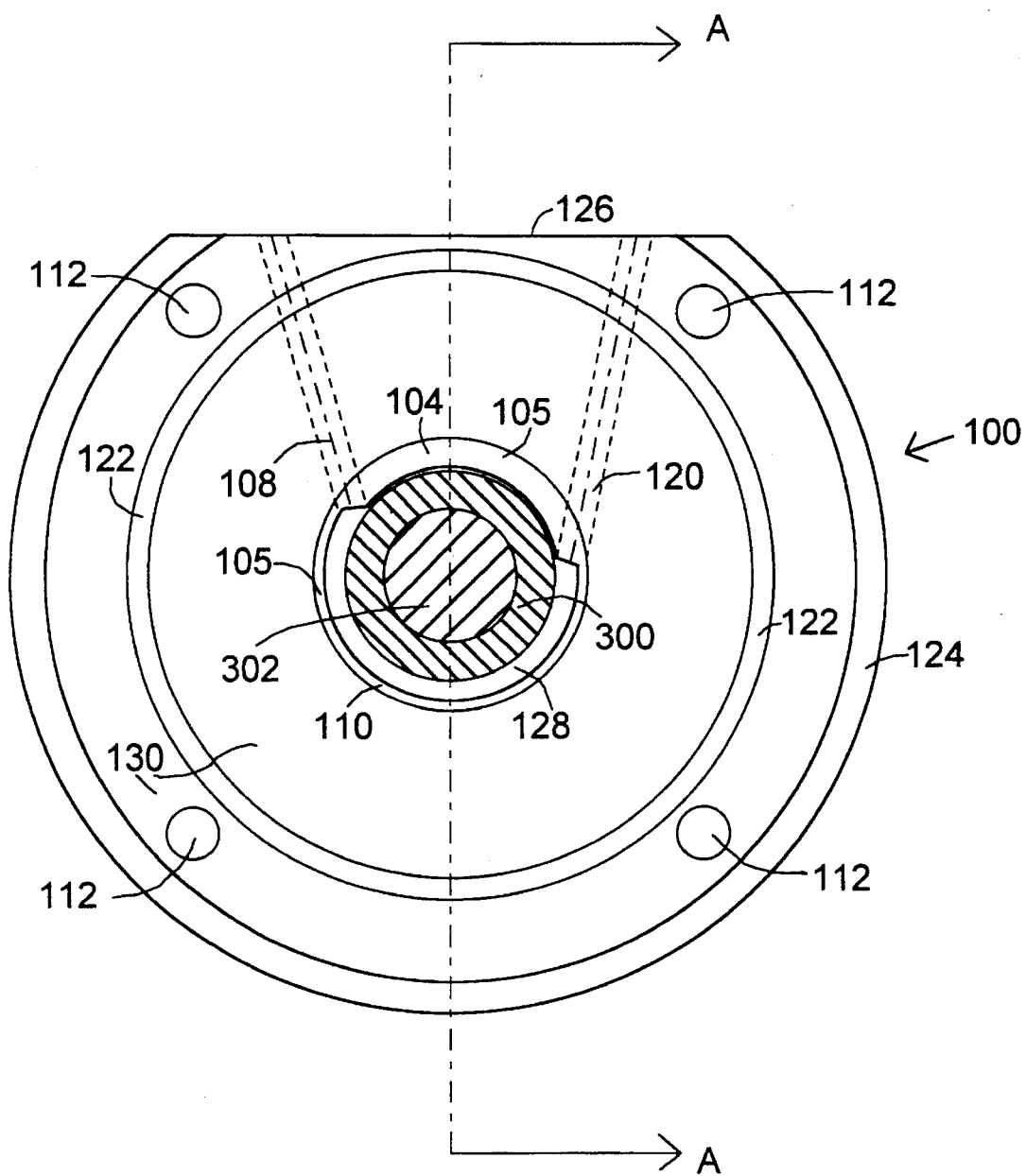
FIG. 2 shows an elevation view of a first face of the housing depicted in greater detail than in FIG. 1.
Figure 3:
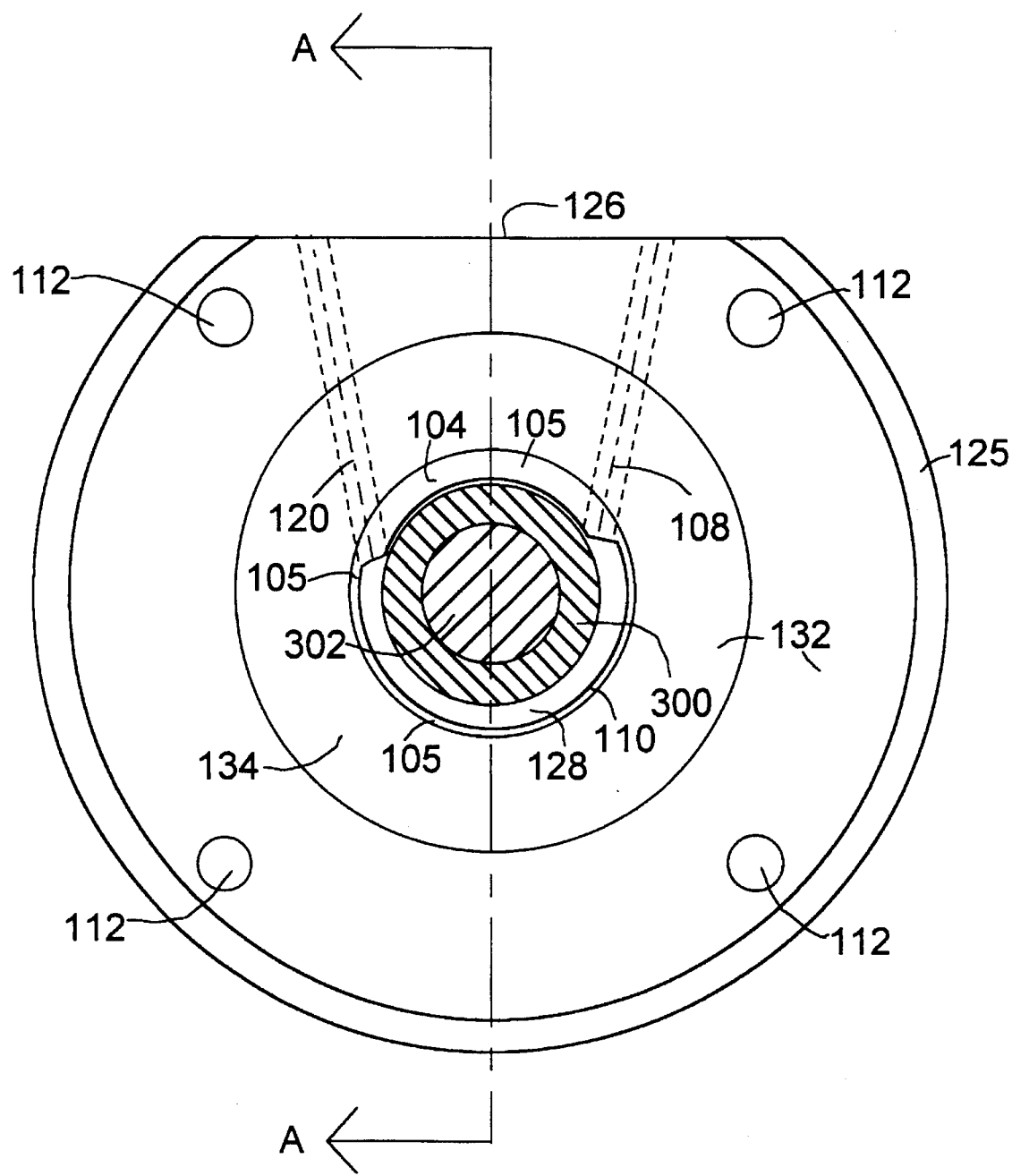
FIG. 3 shows an elevation view of a second face of the housing of FIG. 1.

Referring to FIG. 1 through FIG. 3, a preferred embodiment of the seal assembly comprises a housing 100, a shaft 302, a first seal 200, a second seal 202, and a reservoir 10. The housing 100 has a hollow section 101 with its boundaries defined by a cylindrical surface 102 and a first curved protrusion 104. In addition, the housing 100 has a first channel 108 and a second channel 120 extending from the hollow section 101. The shaft 302 may have, but need not have, a sleeve 300 coaxially oriented with respect to the shaft 302. In practice, the shaft 302 may be an integral component of a drive motor that provides shaft bearings for shaft 302. When the shaft 302 is coaxially aligned within the hollow section 101 and when the first seal 200 and the second seal 202 adjoin the cylindrical surface 102, a chamber 128 (FIG. 2 and FIG. 3) is formed. The chamber 128 is bounded by the sleeve 300 (or the shaft 302), the first seal 200, and the second seal 202. A lubricating fluid, such as oil, is placed in the chamber 128. Upon rotation of the shaft 302 the lubricating fluid is pressurized and circulated to the reservoir 10 via the first channel 108; circulated from the reservoir 10 to the chamber 128 via the second channel 120. If the reservoir 10 has a transparent portion or semi-transparent portion, a user can readily observe changes in the level of the lubricating fluid to verify the integrity of the first seal 200 and the second seal 202. In addition, if the first seal 200 fails, or is intentionally selected to leak in a predefined manner, the integrity of additional fluid containment devices located in series with respect to the first seal 200 and the second seal 202 may be determined. For example, if the first seal 200 comprises a unidirectional single lip seal, then the first seal 200 may leak fluid in a predefined manner and act as a "one-way valve." Leakage through the single lip seal may be enhanced by a differential pressure on opposite sides of the lip seal.

Housing

The housing 100 generally comprises a substantially cylindrical plate. In practice, the shape of the housing 100 may vary from a substantially cylindrical plate as best illustrated in FIG. 2 and FIG. 3. FIG. 2 and FIG. 3 show a flat area 126 to accommodate the attachment of the housing 100 to the reservoir 10. FIG. 2 shows that a first face 130 of the housing 100 has a groove 122 to facilitate the sealing and attachment of the housing 100 to the casings of various fluid pumps. The groove 122 accepts an 0-ring or a gasket for sealing purposes. FIG. 3 shows that a second face 132 has an elevated collar 134 and a collar interior 136 to accommodate the widths of the first seal 200 and the second seal 202. The housing 100 has holes 112 for mounting the housing 100 to various fluid pumps.

The housing 100 has a hollow section 101 defined by a cylindrical surface 102 and a first curved protrusion 104. The first curved protrusion 104 is elevated above, or extends radially from, the cylindrical surface 102. The first curved protrusion 104 defines an arc ranging from 120 degrees to 145 degrees; preferably the arc is approximately 135 degrees. The housing 100 may also have a second curved protrusion 110, which bounds the hollow section 101. The second curved protrusion 110 defines a second arc and is elevated above the cylindrical surface 102. If the second curved protrusion 110 is present, the first curved protrusion 104 and the second curved protrusion 110 collectively form an annular ridge 105. The first curved protrusion 104 has a higher height above the cylindrical surface 102 than the second curved protrusion 110 has.

The housing has a first channel 108 and a second channel 120. The first channel 108 extends from the hollow section 101 at a first aperture 106 to the reservoir 10. The second channel 120 extends from the hollow section 101 at a second aperture 118 to the reservoir 10. The first channel 108 and the second channel 120 may be created by boring the housing 100. The longitudinal axes of first channel 108 and the second channel 120 are oriented substantially tangentially to the circumference of sleeve 300, as best illustrated in FIG. 2 and FIG. 3. The first channel 108 preferably has a greater cross section than the second channel 120. The first channel 108 functions as a volute to increase the pressure of lubricating fluid discharged from the clockwise rotation of the shaft 302 when the housing 100 is oriented as shown in FIG. 2. The second channel 120 preferably functions to return lubricating fluid from the reservoir 10 to the chamber 128.

Shaft

The shaft 302 is coaxially aligned with respect to the cylindrical surface 102, or with respect to the arc of the first curved protrusion 104. For consistency in manufacturing the seal assembly and for protection of the shaft 302 from erosion, corrosion, and wear, the shaft 302 preferably has a sleeve 300. The sleeve 300 is arranged coaxially about the shaft 302. The sleeve 300 may be affixed to the shaft by a key (not shown), by threading (not shown) the sleeve 300 onto the shaft 302, or by other techniques known to those of ordinary skill in the art. However, a sleeve 300 should not be used where the sleeve 300 would appreciably reduce impeller suction, for instance, in a relatively small centrifugal pump.

Figure 4:
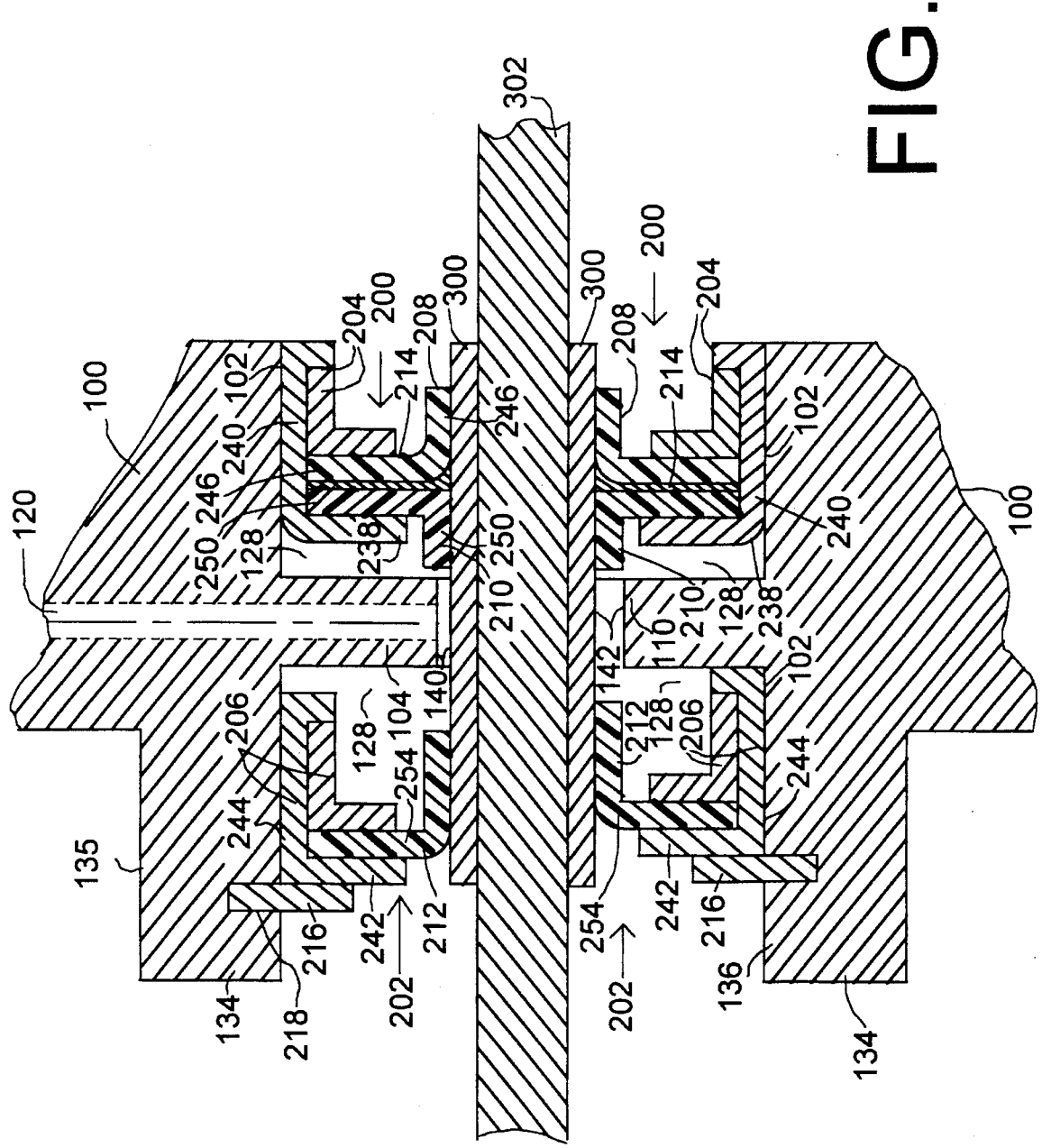
FIG. 4 shows a cross-sectional view along the reference line A—A of FIG. 2 or FIG. 3; wherein the first seal and the second seal each comprise a lip seal.

In a preferred embodiment, the sleeve 300 is substantially cylindrical and has predefined surface tolerances for shaft roughness and waviness of a circumferential surface 330. The sleeve 300 may have, but need not have, a finish of 6–16 microinches arithmetic average roughness. Alternatively, the sleeve 300 may have surface irregularities or grooves to facilitate increased application of forces upon the lubricating fluid. The sleeve 300 is coaxially oriented in a first clearance 140 relative to the first curved protrusion 104. In a preferred embodiment, the first clearance 140 between the sleeve 300 and the first curved protrusion 104 ranges from approximately 15 thousandths to 40 thousandths of an inch; optimally is approximately 20 thousandths of an inch. The first clearance 140 between the sleeve 300 and the second curved protrusion 110 is greater than a second clearance 142 between the sleeve 300 and the first curved protrusion 104 as best illustrated by FIG. 4. Referring to FIG. 2, shearing forces on the lubricating fluid in the chamber 128 from the clockwise rotation of shaft 302 and the restricted flow of the lubricating fluid around the first curved protrusion 104 cause the lubricating fluid to be pressurized at the first channel 108 and sucked from the second channel 120.

Reservoir

Reservoir 10 comprises a vessel having a fixed volume which is suitable for containing a fluid, such as the lubricating fluid. Reservoir 10 is coupled to the chamber 128 via the first channel 108 and the second channel 120. As shown in FIG. 1, the reservoir 10 is a substantially rectangular vessel. In a preferred embodiment, the reservoir 10 has a fluid level gauge 11 such that a user can monitor or measure the level of lubricating fluid. The fluid level gauge 11 comprises a dip stick, a float gauge, a transparent window, a translucent window, a transparent reservoir, or a translucent reservoir, or the like. For example, the fluid level gauge 11, illustrated in FIG. 1, comprises a portion of the reservoir 10 which has a glass window or a clear plastic window with markings to facilitate the measurement of the volume of fluid contained in the reservoir 10. In other embodiments of the seal assembly, the reservoir 10 substitutes various arrangements of optoelectronic leak detectors for the transparent window. Various optoelectronic leak detectors or detection means are described subsequently in this specification.

In practice, an exterior surface of the reservoir 10 may have fins (not shown) to improve heat dissipation of the lubricating fluid. Alternatively, a heat sink (not shown) may be affixed to the reservoir 10 to improve heat dissipation and pumping efficiency of the lubricating fluid.

First Seal and Second Seal

The first seal 200 and the second seal 202 adjoin the cylindrical surface 102 and the sleeve 300 when the seal assembly is assembled. In a preferred embodiment, the first seal 200 preferably comprises a single lip seal and the second seal 202 comprises a dual lip seal having bidirectional hydraulic sealing ability, as best illustrated in FIG. 4. The chamber 128 is bounded by the first seal 200, the second seal 202, the first curved protrusion 104, and the cylindrical surface 102. Alternatively, a chamber 128 is bounded by the first seal 200, the second seal 202, and the annular ridge 105.

If the seal assembly is cooperatively attached to a centrifugal pump, then a user can determine the integrity of the first seal 200 or the second seal 202 from the inspection of the level of lubricating fluid in the reservoir 10. Typically, the seal assembly is arranged as a redundant seal assembly and will generally not be exposed to a leak absent a failure of the primary seal or primary containment device of the centrifugal pump.

Referring to FIG. 4, the preferred embodiment of the first seal 200 and the second seal 202 is shown. In FIG. 4 the housing 100 is cut along line A—A of FIG. 2 to expose a cross-sectional view of the chamber 128, the first seal 200, and the second seal 202. The boundary of the chamber 128 is defined by the first seal 200, the second seal 202, the first curved protrusion 104, the second curved protrusion 110, and sleeve 300. As illustrated in FIG. 1 in conjunction with FIG. 4, the first seal 200 comprises a dual lip seal. The first seal 200 has a first seal frame 204, which has a first circular portion 238 integrally adjoining a first cylindrical portion 240 at an approximate right angle. In a preferred embodiment, the first seal frame 204 is constructed from stainless steel (i.e. type 304 stainless steel).

The first seal 200 has an alpha annular hydrodynamic element 208 and a beta annular hydrodynamic element 210, which are operably attached to the first seal frame 204. The alpha annular hydrodynamic element 208 has an alpha orthogonal cross section 246, which is a right-angled cross section or an L-shaped cross section. The beta annular hydrodynamic element 210 has a beta orthogonal cross section 250, which is a right-angled cross section or an L-shaped cross section. The alpha annular hydrodynamic element 208 and the beta annular hydrodynamic element 210 are preferably constructed from an elastomer, polytetrafluoroethylene, or the like. A wedge 214 separates the alpha annular hydrodynamic element 208 from the beta annular hydrodynamic element 210. The sealing edges of the alpha annular hydrodynamic element 208 and the beta annular hydrodynamic element 210 are preferably oriented in opposite directions as shown in FIG. 4 such that a bidirectional seal is formed.

The second seal 202 has a second seal frame 206. The second seal frame 206 has a second circular portion 242 integrally adjoining a second cylindrical portion 244 at an approximate right angle. The second seal 202 has a delta annular hydrodynamic element 212 that is operably attached to the second seal frame 206. The delta annular hydrodynamic element 212 has a delta orthogonal cross section 254, which is a right-angled cross section or an L-shaped cross section. The delta annular hydrodynamic element 212 is preferably constructed from polytetrafluoroethylene, flexible graphite foil, or an elastomer. Lip seals like the first seal 200 and the second seal 202 are commercially available through various suppliers, such as Tri-Tec Seal, Inc., 1120 Fenway Circle, Fenton, Mich. 48430.

The second seal 202 is preferably secured by the combination of a retainer channel 218 and a retainer 216. The retainer 216 comprises a snap ring, a steel retaining ring, a clip, or the like. The retainer 216 engages a retainer channel 218. The retainer channel 218 is located in a collar interior 136 of the elevated collar 134. If a lubricating fluid is placed in the chamber 128, then the beta annular hydrodynamic element 210 and the delta hydrodynamic element 212 are compressed against sleeve 300 in response to increased pressure of the lubricating fluid such that efficient sealing between the sleeve 300 and each hydrodynamic element occurs. Note that the collar height 135 of the elevated collar 134 above the housing 100 may correspond to the axial width of the first seal 200 and the axial width of the second seal 202. The axial width of the first seal 200 and the axial width of the second seal 202 are primarily determined by the axial width of the first seal frame 204 and axial width of the second seal frame 206, respectively. In FIG. 4, the axial width of first seal frame 204 and the axial width of the second seal frame 206 are oriented parallel to the axis of rotation of the shaft 302. Note that the prefixes "alpha," "beta," and "delta" are used above to modify the elements of the first seal 200 and the second seal 202. The prefixes "alpha," "beta," and "delta" are merely arbitrary identifiers used to distinguish separate, but substantially identical, elements from each other.

Variations of Seal Assembly

Figure 5A:
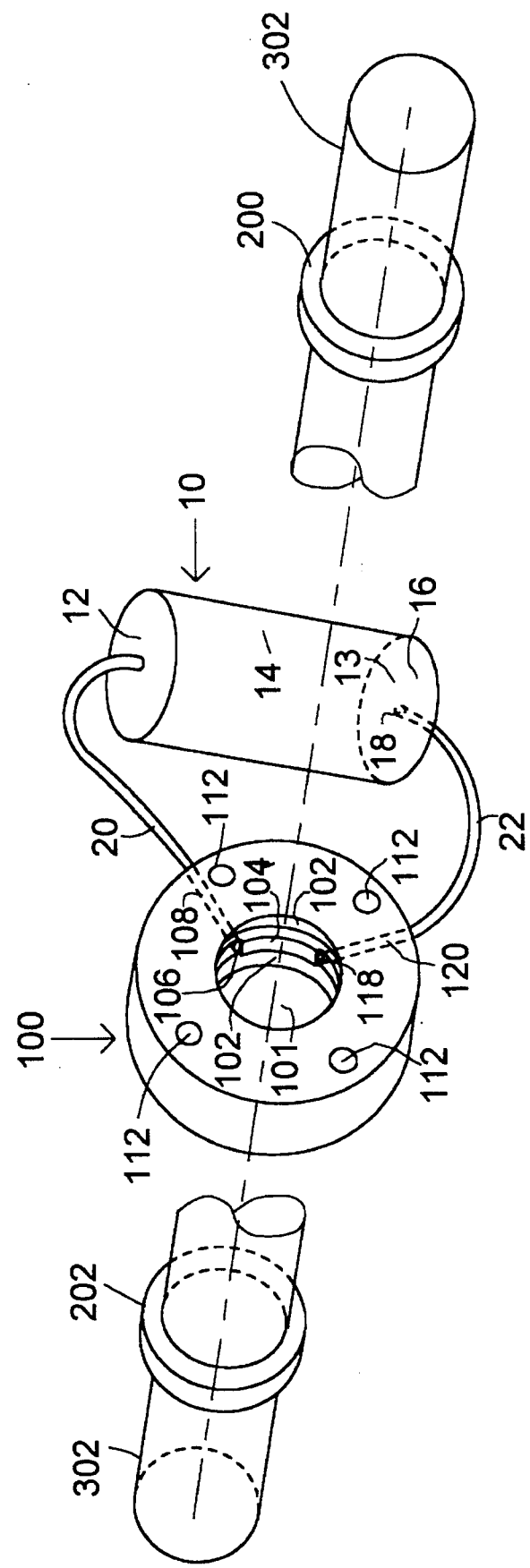
FIG. 5A illustrates a perspective view of an alternate embodiment of the seal assembly with the shaft broken and spaced apart to better illustrate the details of the housing.
Figure 5B:
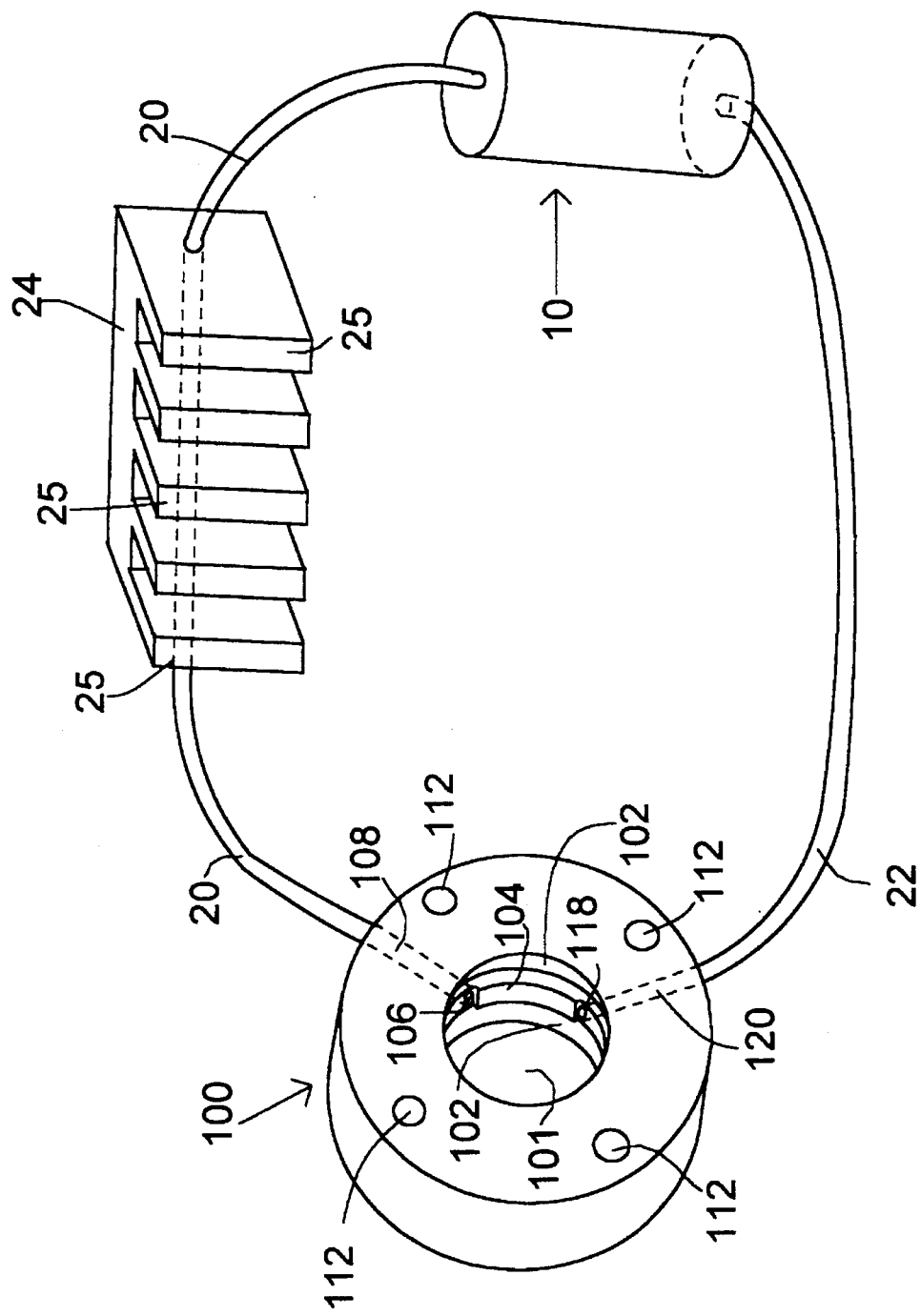
FIG. 5B illustrates a perspective view of an alternate embodiment of the seal assembly wherein the seal assembly has a heat sink for cooling the lubricating fluid.

Referring to FIG. 5A and FIG. 5B, several variations of the seal assembly depicted in FIG. 1 are shown. In particular, FIG. 5A shows an alternate embodiment of the seal assembly where the first channel 108 and the second channel 120 are coupled to the reservoir 10 via an inlet conduit 20 and an outlet conduit 22, respectively. Note that the inlet conduit 20 and the outlet conduit 22 have predetermined minimum bending radii to prevent the viscosity of the lubricating fluid from substantially impeding the flow of lubricating fluid. In addition, the perspective view of FIG. 5A fully illustrates the first curved protrusion 104, the first aperture 106 and the second aperture 118. The first aperture 106 and the second aperture 118 are proximately disposed at the intersection of the first curved protrusion 104 and the second curved protrusion 110. As illustrated in FIG. 5A, the reservoir 10 has a substantially translucent or transparent peripheral surface 14. The peripheral surface 14 may have measurement markings (not shown) to facilitate a user's measuring changes in the level of the lubricating fluid. FIG. 5B illustrates the embodiment of FIG. 5A with the addition of a heat sink 24. The heat sink 24 has fins 25 to increase heat dissipation and cool the lubricating fluid. The lubricating fluid is pumped efficiently by the shaft 302, or by sleeve 300 when the maximum temperature of the lubricating fluid is limited by the heat sink 24 to a predefined maximum temperature at a given ambient temperature.

Variations of the First Seal and the Second Seal

Figure 6:
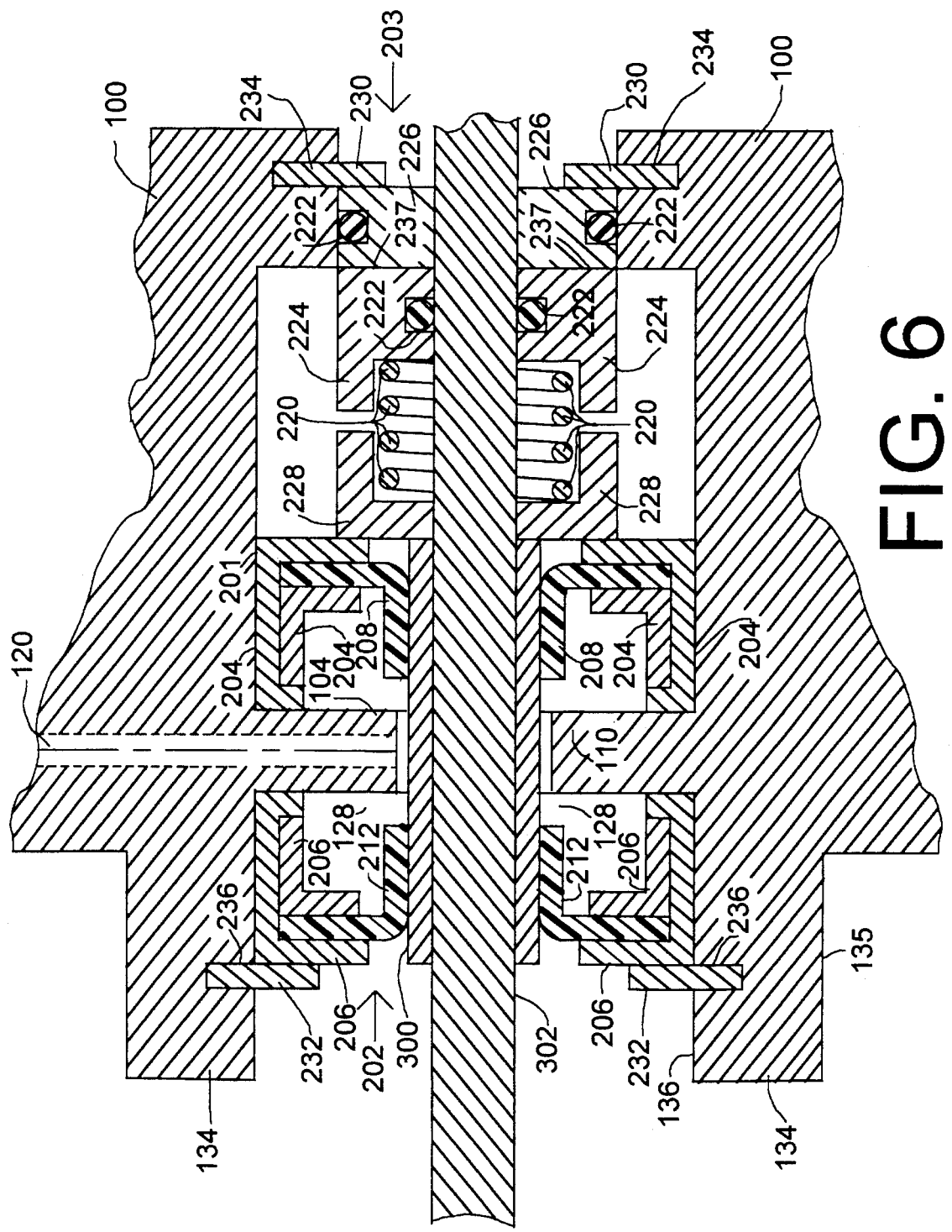
FIG. 6 shows a cross-sectional view of an alternate embodiment along the reference line A—A of FIG. 2 or FIG. 3; wherein the seal assembly uses a mechanical seal.
Figure 7:
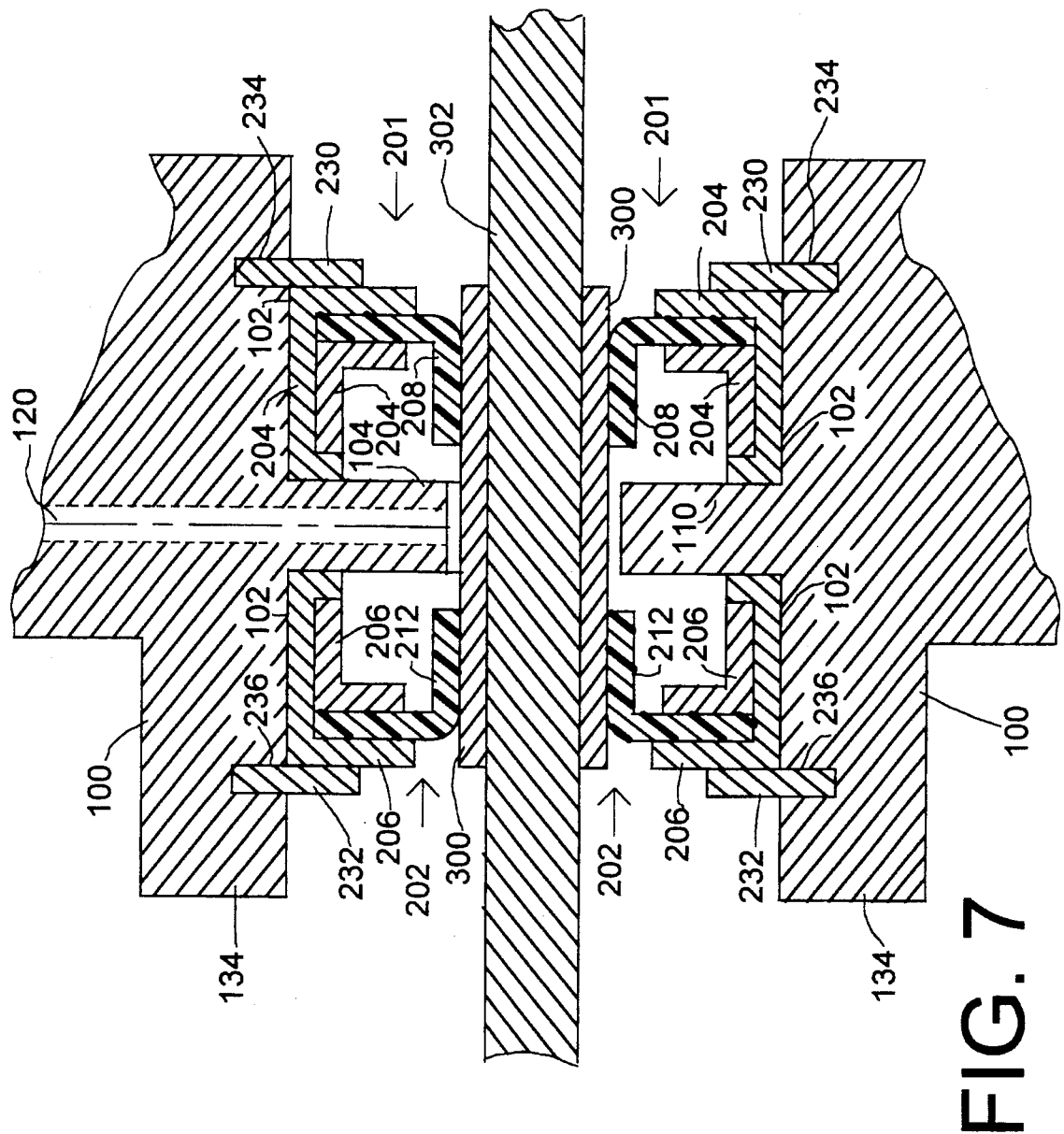
FIG. 7 shows a cross-sectional view of an alternate embodiment along the reference line A—A of FIG. 2 or FIG. 3; wherein the first seal and the second seal each comprise a lip seal.

FIG. 6 and FIG. 7 illustrate cross-sectional views of alternative embodiments of seal arrangements taken along line A—A of FIG. 2 or FIG. 3. FIG. 6 shows an embodiment where the first seal 200 and the second seal 202 are both unidirectional seals, and where a third seal 203 comprises a mechanical seal. FIG. 7 shows an embodiment where the first seal 200 and the second seal 202 are both unidirectional lip seals oriented in a multiple seal configuration. The selection of the seal arrangement, including the first seal 200 and the second seal 202, may determine how the lubricating fluid is affected, if at all, by a failure of a primary seal in a centrifugal pump, to which the seal assembly is attached.

FIG. 6 illustrates an embodiment of the seal assembly which uses the combination of a mechanical seal (i.e. third seal 203) and a lip seal (i.e. alternate first seal 201) in lieu of the bidirectional lip seal (i.e. first seal 200) of FIG. 4. The third seal 203 is preferably a mechanical seal or a magnetically biased mechanical seal. The alternate first seal 201 is substantially identical to the second seal 202 of FIG. 4. The alternate first seal 201 is preferably oriented so that the alpha annular hydrodynamic element 208 can seal a lubricating fluid within the chamber 128. Meanwhile, the third seal 203 is oriented to prevent pumped fluid from potentially leaking into or past the chamber 128. The third seal 203 is optimally secured by a first retaining ring 230, which engages a first retaining channel 234. The second seal 202 is optimally secured by a second retaining ring 232, which engages a second retaining channel 236.

The third seal 203 comprises a spring retainer 228, a spring 220, a sealing ring 224, a mating ring 226, and secondary sealing elements 222. The spring retainer 228 is preferably affixed to the shaft 302. Axial sliding movement of the spring retainer 228 may be prevented by strategically locating the sleeve 300 adjacent to the spring retainer 228 as shown in FIG. 6. The spring 220 biases the sealing ring 224 against the mating ring 226. Contact between the sealing ring 224 and the mating ring 226 occurs at faces 237. Secondary sealing elements 222 are made from elastomers, polytetrafluoroethylene (PTFE), or the like. The secondary sealing elements 222 may be shaped like 0-rings, wedges, V-rings, U-cups, or the like. As the faces 237 wear spring 220 retains contact between the faces 237. The faces 237 may be lubricated by providing a path for pressurized lubricating fluid from the chamber 128. Alternatively, the faces 237 may be lubricated by an oil ring coupled to the shaft 302. As is well-known to those of ordinary skill in the art, an oil ring (not shown) may dip into an oil-filled reservoir and distribute the oil accumulated from dipping on the faces 237. Various types of lip seals, packing, or mechanical seals may be substituted for the third seal 203 illustrated in FIG. 6. For example, the third seal 203 may be replaced by a pusher mechanical seal, a non-pusher mechanical seal, an elastomeric bellow mechanical seal, a metallic bellow seal, a hydraulically balanced mechanical seal, or a hydraulically unbalanced mechanical seal.

As illustrated in FIG. 6, the third seal 203 comprises a spring-biased mechanical face seal. A detailed description of such a mechanical seal is described in U.S. Pat. No. 4,036,505, entitled "Mechanical Seals" and issued to Floyd et al., which is hereby incorporated into this specification by reference. One disadvantage of mechanical seals are that spring biasing frequently necessitates greater space than a comparable lip seal. However, commercially available magnetically biased face seals occupy less space than traditional spring biased mechanical face seals. Hence, by using magnetically biased face seals (not shown), the collar height 135 of the elevated collar 134 of the housing 100 may be minimized; and the axial length of shaft 302 may also be minimized.

FIG. 7 illustrates another seal arrangement in which the alternate first seal 201 may function as a one-way valve when pumped fluid at a pressure, which is significantly greater than the pressure of the lubricating fluid contained in the chamber 128, is present. In other words, the alternate first seal 201 is a unidirectional lip seal. If the seal assembly is oriented in series with respect to potential fluid paths from a leaking containment device (or a primary seal) of a centrifugal pump, then the volume of fluid contained in the chamber 128 may increase upon the failure of a fluid containment device (or a primary seal) in the centrifugal pump. Meanwhile, the second seal 202 prevents fluid from a leaking containment device (or leaking primary seal) from escaping into the outside environment. In FIG. 7, the alternate first seal 201 is optimally secured by the first retaining ring 230 positioned in the first retaining channel 234. The second seal 202 is optimally secured by the second retaining ring 232 positioned in the second retaining channel 236.

The orientation of the seals in FIG. 7 is easily changed to obtain a tandem seal, dual seal, or a double seal configuration. The actual terminology of the seal configuration technically depends upon the actual hydraulic pressures realized under various pump operating conditions. In particular, seal arrangements are typically classified according to, first, the orientation of two seals defining a seal chamber and, second, the pressure of the seal chamber relative the pressure of the adjacent chamber of the pump. Tandem seals are any orientation of two seals where the seal chamber fluid pressure is less than the adjacent chamber fluid pressure. Double seals are a back-to-back orientation or face-to-face orientation of two seals in which the seal chamber fluid pressure is greater than the adjacent chamber pressure. Dual seals are series oriented (i.e. face-to-back orientation) of two seals in which the chamber fluid pressure is greater than the adjacent chamber fluid pressure.

Variations of the Shaft, Sleeve, and Housing To Form an Internal Vane Rotary Pump In an alternate embodiment of the seal assembly, the combination of the shaft 302, the sleeve 300, vanes 308, vane springs 306, and a cam surface 312 forms an internal vane pump 310 (i.e. vane-in-rotor pump). The internal vane pump 310 has radial cavities 304 in the sleeve 300. The radial cavities 304 may also extend into the shaft 302. A vane spring 306 and a vane 308 is placed in each radial cavity 304. Each vane 308 may be cubical, cylindrical, or rectangular. Likewise, each radial cavity 304 may be cylindrical, cubical, or rectangular.

The hollow section 101 of the housing 100 is defined by a smooth cam-shaped surface 312 to direct the vanes 308 into the radial cavities 304 at the appropriate sector of the sleeve's rotation. The vane spring 306 allows axial movement of the vane spring 306 and radially biases the vane 308 against the cam-shaped surface 312. The cam-shaped surface 312 is an eccentric cylindrical surface positioned with respect to the axis of the shaft 302. The cam-shaped surface 312 may provide a gradual transition from the first curved protrusion 104 to the second curved protrusion 110. The cam-shaped surface 312 is adjacent to, or coextensive with, the first aperture and the second aperture.

The internal vane pump 310 may also include a first annular axial end (not shown) and a second annular axial end (not shown). The first annular axial end is disposed adjacent to the first seal and the chamber. The second annular axial end is disposed adjacent to the second seal and the chamber. The first annular axial end and the second annular axial end provide a seal for the chamber to confine pressure generated by movement of the vanes 308.

Figure 8:
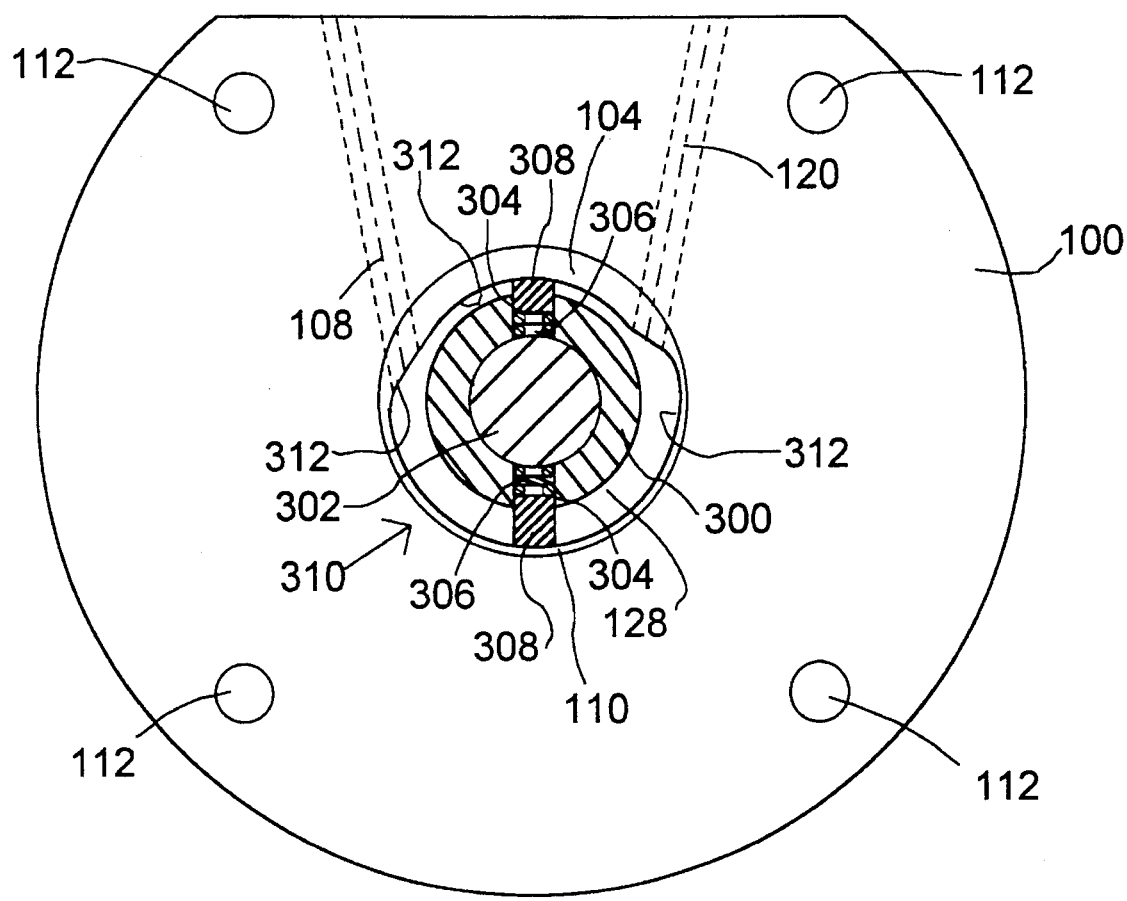
FIG. 8 shows an elevation view of the housing for an alternative embodiment of the housing wherein a vane-in-rotor pump is formed by the sleeve and the housing.

Numerous variations of the shaft 302 and the sleeve 300 to form various hydraulic rotary pumps are possible. For example, although FIG. 8 shows two radial cavities 304, two vanes 308 and two vane springs 306, in practice, more than two radial cavities, two vanes and two vane springs may be used. Another embodiment of the seal assembly may include a flexible vane pump rather than the hydraulic pump illustrated in FIG. 8. In a flexible vane pump, the sleeve 300 has vanes which are oriented radially and tangentially relative to the shaft. The flexible vanes conform to the annular ridge to form an adequate seal.

Incorporation of the Seal Assembly Into a Magnetic-Drive Centrifugal Pump

Figure 9:
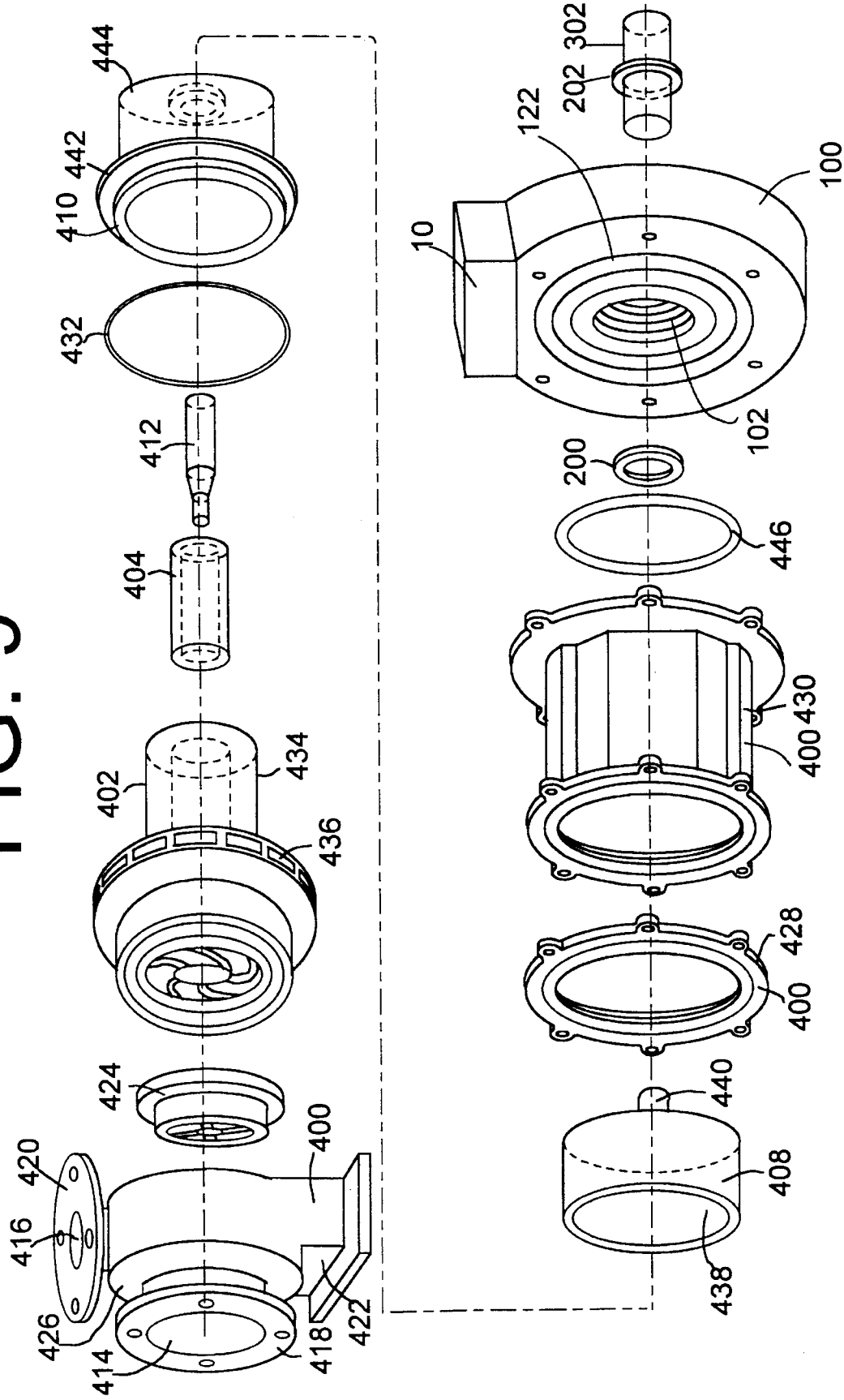
FIG. 9 illustrates an exploded perspective view of a preferred embodiment of the seal assembly incorporated into a centrifugal sealless magnetic-drive pump.
Figure 10:
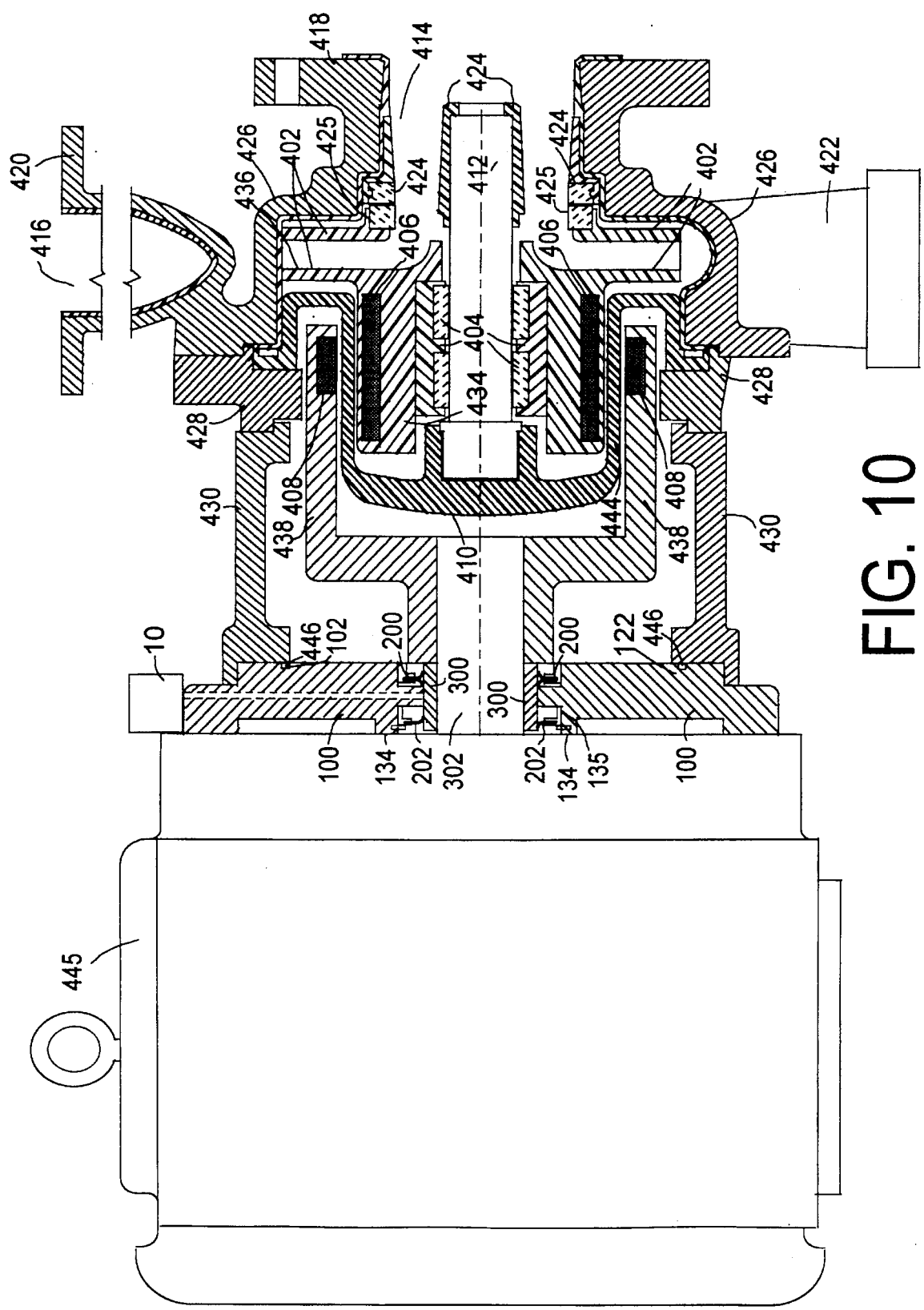
FIG. 10 illustrates a cross-sectional view of a preferred embodiment the seal assembly incorporated into a centrifugal sealless magnetic-drive pump.

FIG. 9 and FIG. 10 illustrate the seal assembly incorporated into a synchronous magnetic-drive centrifugal pump. Magnet-drive centrifugal pumps are generally classified as synchronous magnetic-drive pumps or nonsynchronous magnetic-drive pumps. Synchronous magnetic-drive centrifugal pumps typically comprise a casing 400, a shaft 302 (i.e. a drive shaft), a pump shaft 412, an impeller 402, a bearing 404, a first magnet 406, a second magnet 408, and a containment shell 410. Nonsynchronous magnetically driven pumps comprise a casing, a drive shaft, a pump shaft, an impeller, a bearing, a magnet, a torque ring, and a containment shell (not shown). The primary difference between the nonsynchronous magnetic-drive pump and the synchronous magnetic-drive pump is the substitution of the conductive torque ring for the first magnet. An example of a magnetic-drive centrifugal pump is disclosed in U.S. Pat. No. 5,066,200, issued to Ooka, which is hereby incorporated by reference into this specification.

As illustrated in FIG. 9, the synchronous magnetic-drive centrifugal pump has a casing 400 that includes a first casing member 426, a second casing member 428, and a third casing member 430. The first casing member 426 and the second casing member 428 adjoin a first gasket 432 and a containment shell 410 to provide sealing of the pumped fluid within the pump interior. The first gasket 432 may be shaped like an 0-ring, a U-ring, a wedge, a substantially flat gasket, or the like. The third casing member 430 adjoins the second casing member 428. Fasteners (not shown) preferably secure the first casing member 426 to the second casing member 428 and secure the second casing member 428 to the third casing member 430.

The casing 400 may be constructed from cast iron, stainless steel, or other metals. The interior fluid-contacting surfaces of the casing 400 are preferably coated with a corrosion-resistant lining material. The second casing member 428 is preferably constructed from a plastic resin, such as fluoroplastic.

The casing 400 has an inlet 414 to receive fluids and an outlet 416 to emit fluids. The casing 400 has an inlet flange 418 and an outlet flange 420 for the attachment of external plumbing to the pump. The inlet flange 418 and the outlet flange 420 have a plurality of holes 419 to facilitate the attachment of external plumbing to the pump.

The impeller 402 is located within the interior of the first casing member 426 in a path between the inlet 414 and the outlet 416. The impeller 402 is rotatably mounted upon the pump shaft 412 via the bearing 404. A shaft support 424 supports the pump shaft 412 near the impeller 402. In a preferred embodiment, the pump shaft 412 is made from silicon carbide. The bearing 404 is preferably a sleeve bearing and separates the impeller 402 from the pump shaft 412. The impeller 402 has a cylindrical portion 434 and a vane portion 436. A mouth ring (not shown) may engage the impeller 402 near the vane portion 436. As illustrated in FIG. 9, the vane portion 436 has a fully-closed vane arrangement, in which the vanes are concealed by a back shroud and a front cover plate. In practice, the impeller 402 may have partially open vane arrangement or fully-open vane arrangement depending upon the characteristics (i.e. percentage of solid contents) of the fluid to be pumped. The impeller 402 is preferably formed from plastic or a composite material. The first magnet 406 is affixed to the cylindrical portion 434 of the impeller 402 and the first magnet 406 is preferably enclosed in a plastic or a composite material. In practice, the first magnet 406 comprises a plurality of rare earth magnets. The first magnet 406 may be referred to as a first magnet assembly particularly where the first magnet includes the plurality of magnets. The cylindrical portion 434 of the impeller 402 is surrounded by the containment shell 410, which is secured by the casing 400. A first gasket 432 is optimally placed between the first casing member 426 and the containment shell 410.

The second magnet 408 has a tubular coupling portion 438 and a drive portion 440. The second magnet 408 preferably comprises a plurality of rare earth magnets placed about the circumference of the coupling portion 438. The second magnet 408 may be referred to as a second magnet assembly particularly where the second magnet includes the plurality of magnets. The tubular coupling portion 438 coaxially surrounds the containment shell 410. The drive portion 440 is coupled to a drive motor 445 as shown in FIG. 10. The third casing member 430 encloses the second magnet 408.

The housing 100 of the seal assembly is preferably attached to the casing 400 at the third casing member 430. A drive motor is coupled to the shaft 302 of the seal assembly. Hence, the housing 100 is mounted between the containment shell 410 and the drive motor. The first face 130 of the housing 100 preferably has a groove 122 and a second gasket 446, such as an O-ring, for sealing between the first face 130 and the third housing casing member 430. A close-coupled drive motor could be attached directly to the housing 100 of the seal assembly and the shaft 302 extending from the seal assembly. A close-coupled drive motor may include bearings for supporting the shaft 302. Alternatively, a long-coupled drive motor is coupled to the shaft 302 via a drive shaft, a bearing assembly, a universal joint, a flexible joint, or the like.

Using the Seal Assembly with a Centrifugal Pump

If the containment shell 410 fails or leaks pumped fluid, the seal assembly will provide at least one backup seal (i.e. first seal 200) to prevent pumped fluids from reaching and damaging the drive motor. In addition, if the first seal 200 or the second seal 202 leaks, the seal assembly may be readily, manually inspected for such leaks at the reservoir 10. Alternatively, if the first seal 200 leaks or the second seal 202 leaks, the seal assembly may be automatically configured to shut off the pump, to trigger an alarm, or to control other devices. Hence, leaking of dangerous pumped fluids can be minimized and called to the attention of pump operators and industrial workers.

First, the reservoir 10 is filled with a predetermined or known volume of lubricating fluid. During normal fluid flow in the fluid pump, the seal assembly first circulates fluid from the seal chamber via the hydraulic pump to the reservoir. The hydraulic pump refers to the combination of the shaft, the housing's hollow section (which is defined by the cylindrical surface and the first curved protrusion) and the chamber. From the reservoir, lubricating fluid returns to the chamber by gravity and or suction created by the hydraulic pump. If the seal assembly is coupled to a magnetic-drive centrifugal pump, during normal operation no pumped fluid contacts the first seal or the second seal because the pump's containment shell confines the pumped fluid. In sum, during normal operation of the seal assembly the lubricating fluid level will not significantly fluctuate.

Two basic failure modes influence the level of fluid within the seal chamber. In a first failure mode of the pump (a) the hydraulic pump pressure in the chamber is less than any pumped fluid pressure at the first seal and (b) the first seal is merely a unidirectional seal providing only minimal sealing of the pumped fluid, or the first seal has failed. Therefore, during the first failure mode the pumped fluid leaks from the containment shell of a magnetic-drive centrifugal pump past the first seal and into the chamber. Therefore, the volume of fluid in the chamber may increase from the influx of pumped fluid.

In a second failure mode of the pump, (a) the hydraulic pump pressure is greater than any pressure of the pumped fluid at the first seal and (b) the first seal is merely a unidirectional seal or the first seal has failed. Therefore, during the second failure mode, the lubricating fluid in the chamber may be forced past the first seal into the volume between the containment shell and the casing. In addition, if the second seal fails or leaks pumped fluid is forced past the second seal near the drive motor. Hence, the volume of fluid the seal chamber may decrease from the escape of lubricating fluid to the pump exterior or into the pumped fluid. In sum, the volume of fluid changes with the leakage of the first seal, the second seal, or both the first and the second seals.

Figure 11:
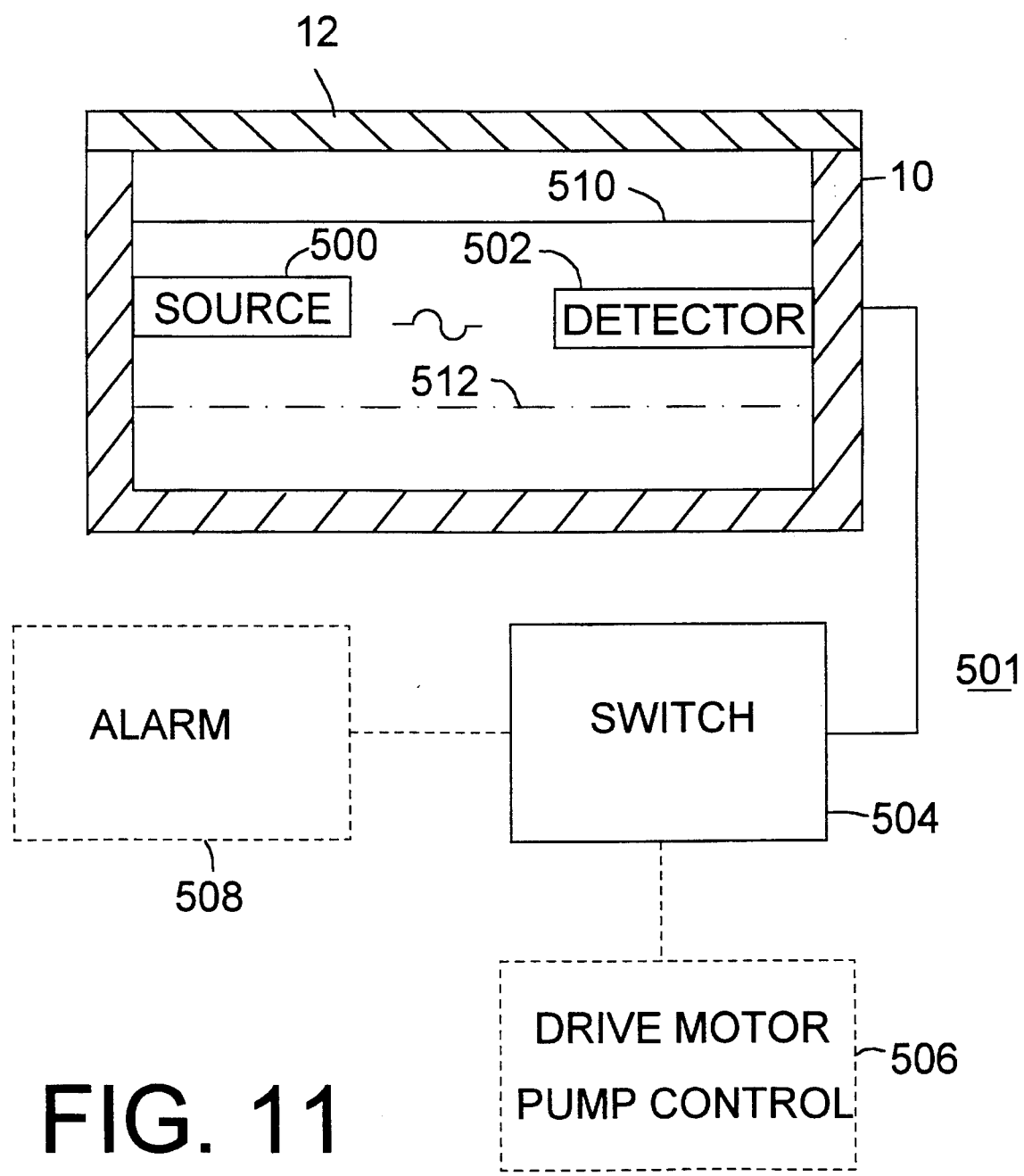
FIG. 11 illustrates a block diagram of one embodiment of the optoelectronic leak detector for a fluid containment device wherein an electromagnetic source and a detector are shown positioned within a cross section of the reservoir.
Figure 12:
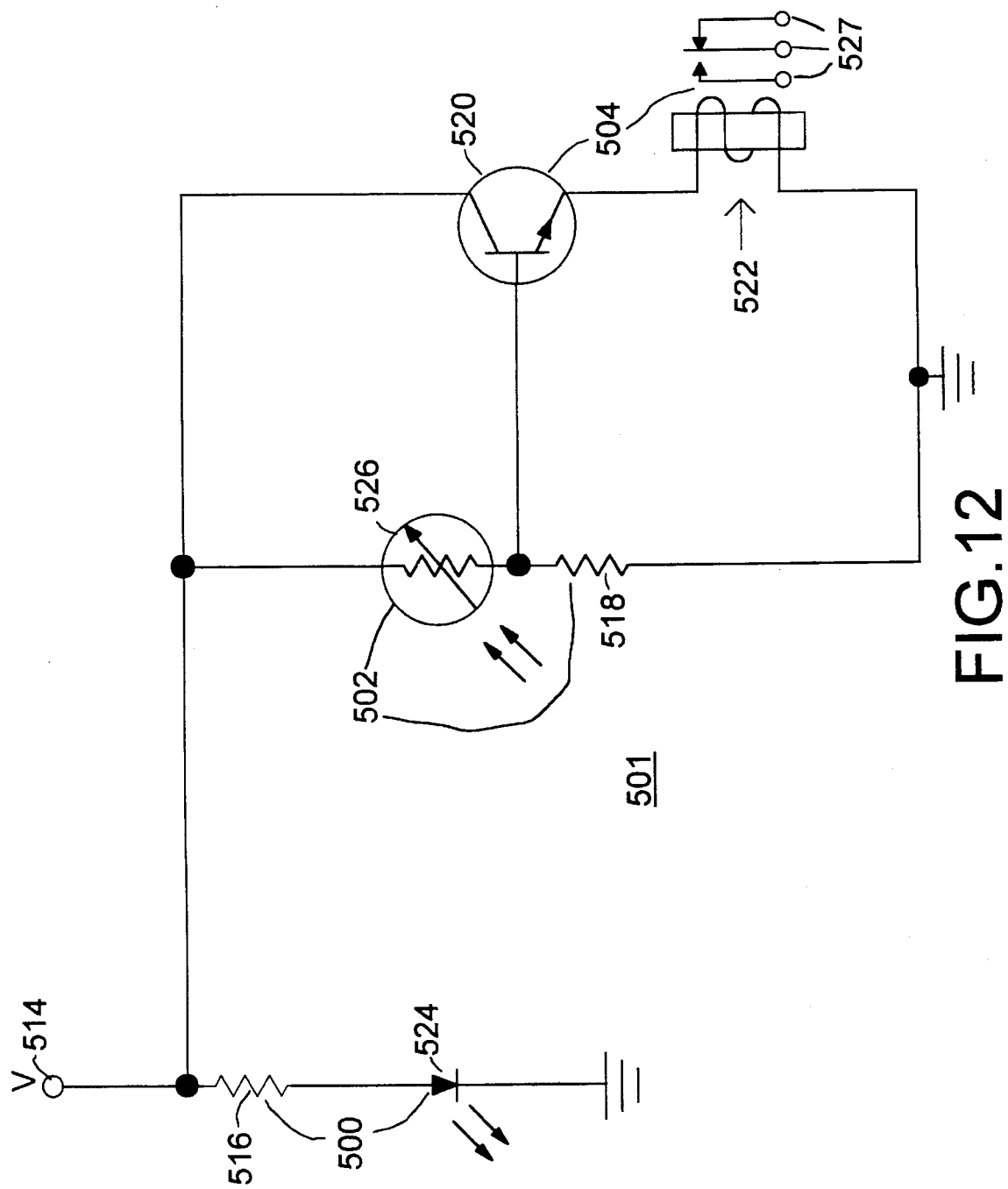
FIG. 12 depicts an illustrative schematic of the block diagram of FIG. 11.
Figure 13:
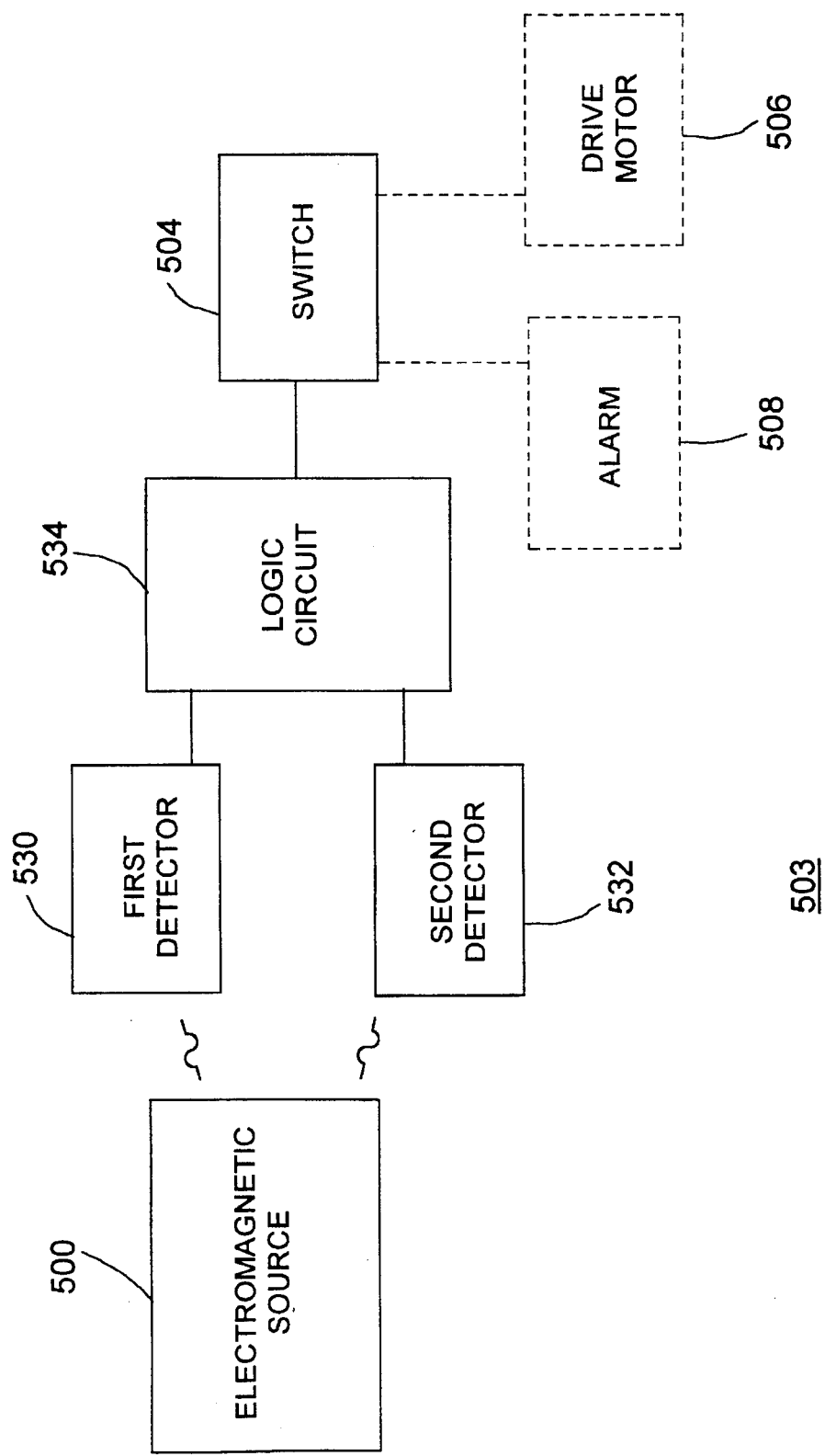
FIG. 13 illustrates another block diagram of the optoelectronic leak detector for a fluid containment device.
Figure 14:
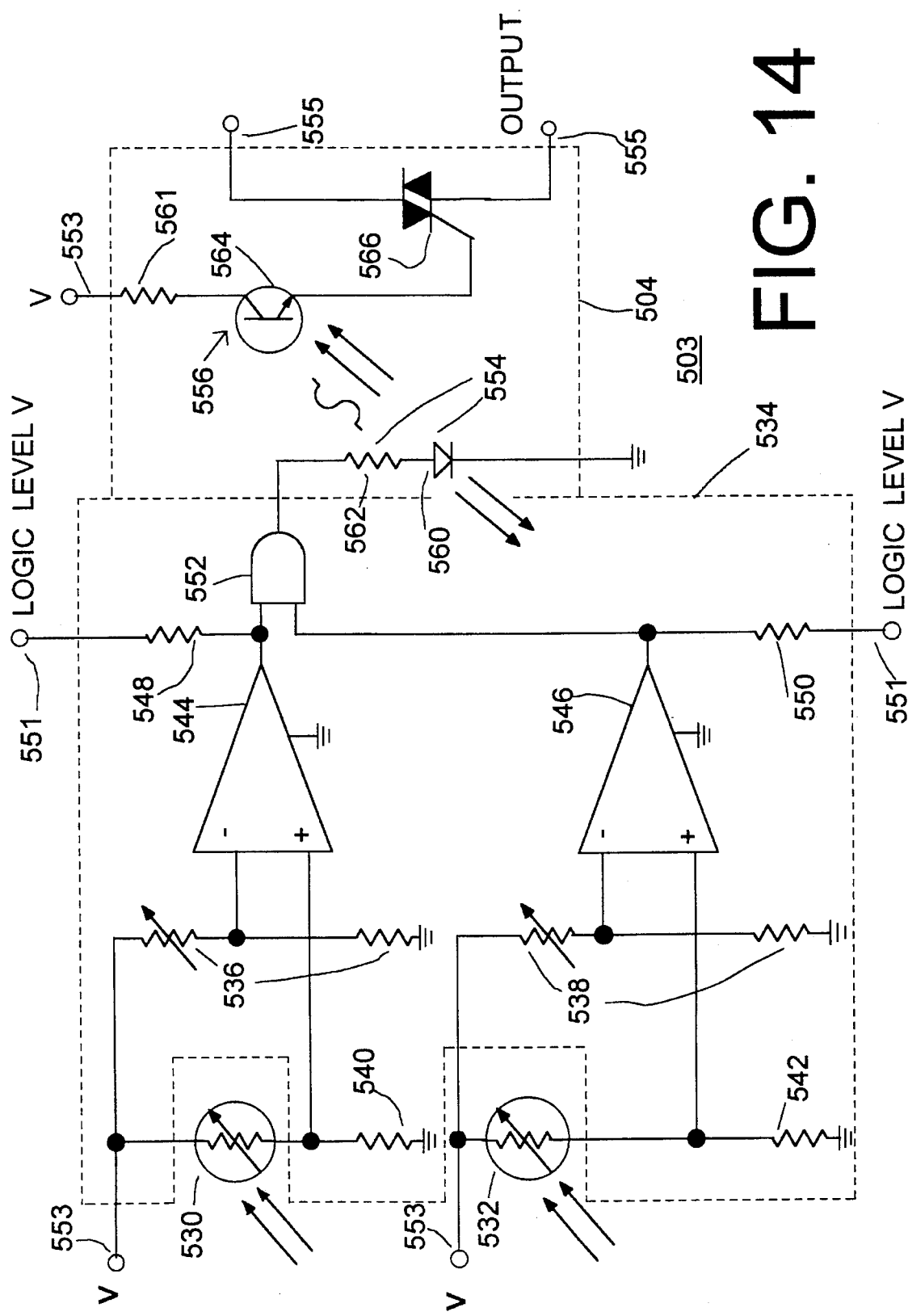
FIG. 14 depicts an illustrative schematic of the block diagram of FIG. 13 wherein the first detector and the second detector comprise photoresistors, and wherein the switch is a "solid state relay."
Figure 15:
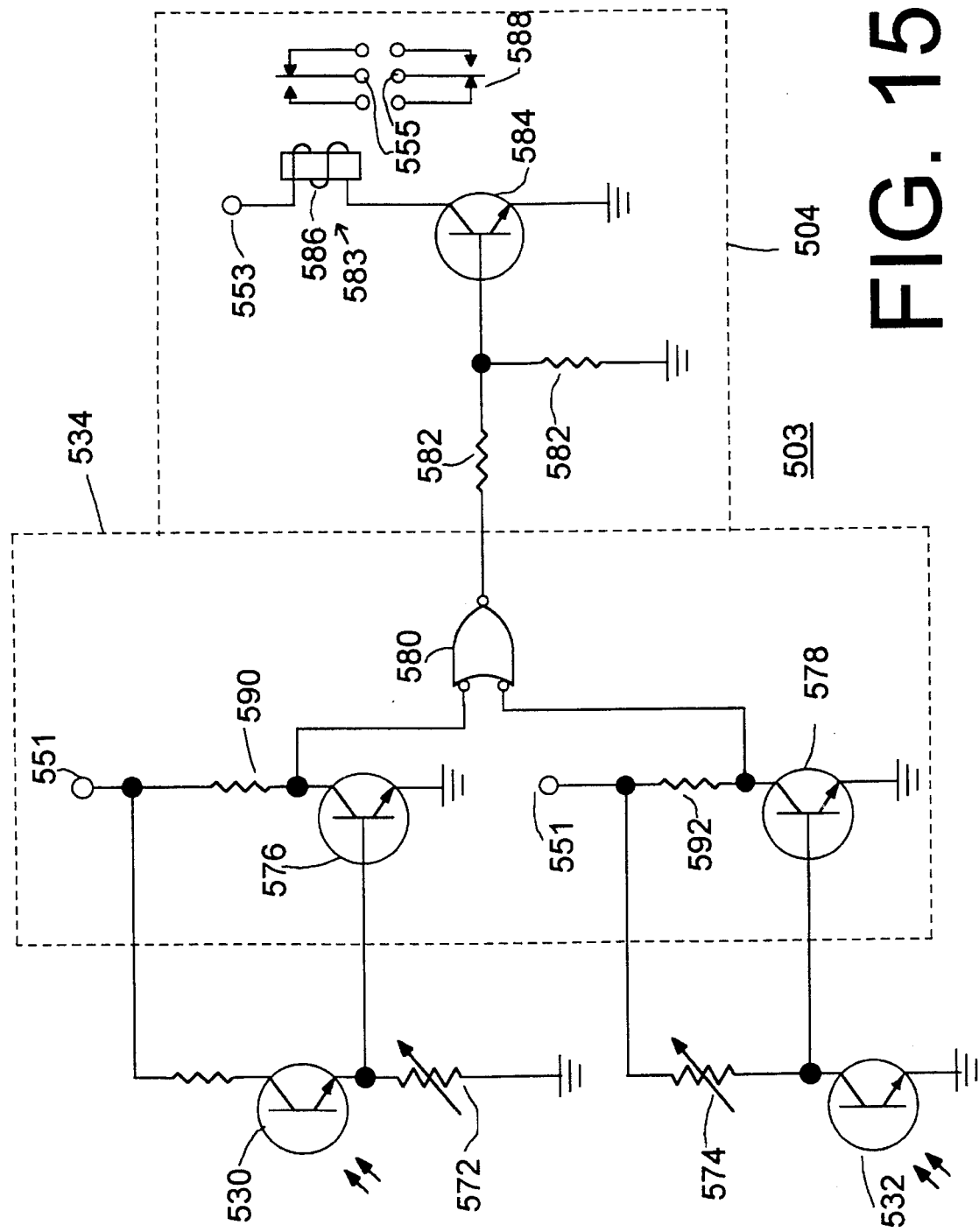
FIG. 15 depicts an illustrative schematic of the block diagram of FIG. 13 wherein the first detector and the second detector comprise phototransistors, and wherein the switch is a solenoidal relay.

Detection Means for Detecting the Leaking of a Fluid Containment Device, Including An Optoelectronic Leak Detector FIG. 11 through FIG. 15, inclusive, show detection means for detecting the leaking, or failure, of a fluid containment device. The fluid containment device refers to one or more of the following: a containment shell of a sealless centrifugal pump, a seal in a fluid pump, the first seal, the second seal, or a third seal. In a preferred embodiment, optoelectronic circuitry is used to detect the failure of a fluid containment device by monitoring changes in the level of fluid in the reservoir 10. FIG. 11 and FIG. 13 generally illustrate the detection means as block diagrams. FIG. 12 provides an illustrative example of an electrical schematic corresponding to the block diagram of FIG. 11. FIG. 14 and FIG. 15 provide illustrative examples of electrical schematics corresponding to the block diagram of FIG. 13. Actual optoelectronic circuits may vary from the schematical illustrations depending upon the qualities of the lubricating fluid (such as opaqueness and refractivity), the positions of the detectors, and the positions of the light source. In addition, actual optoelectronic circuits may vary from the schematical illustrations depending upon whether the system operates primarily based on principles of optical reflection, refraction, or attenuation.

Referring to FIG. 11, the detection means 501 comprises an electromagnetic source 500, a detector 502, and a switch 504. A drive motor 506 and an alarm 508 are optionally coupled to the detection means. A first fluid level 510 in the reservoir 10 is shown by a solid line and a second fluid level 512 is shown be alternating dot and dashes. The detector detects the presence, absence, or amplitude of light associated with the first fluid level 510 and the second fluid level 512. In other words, if the lubricating fluid in the reservoir 10 is opaque or semi-opaque to certain frequencies of electromagnetic radiation, such as visible light or infrared radiation, then the detection means may function based upon optical attenuation of the lubricating fluid. For instance, if the lubricating fluid is at the first level 510, then electromagnetic radiation emitted from the electromagnetic source 500 will be attenuated, if received at detector 502. In contrast, if the lubricating fluid is at the second level 512, then electromagnetic radiation emitted from the electromagnetic source will not be attenuated by the lubricating fluid.

In practice, if the lubricating fluid is substantially transparent or translucent, the affect of optical attenuation of will be inadequate to provide a meaningful indication of the fluid level. Hence, dye may be added to the lubricating fluid to cause optical attenuation of infrared or visible light. Alternatively, the optoelectronic circuitry for the detection means 501 may function based on refraction instead of attenuation. For example, by selectively using a refractive index gradient created by at least one fluid-medium interface, and by using a source producing directive radiation (i.e. a source equipped with a lens), the electromagnetic radiation from the source 500 can be controllably directed toward and away from the detector 502 depending upon the level of fluid in the reservoir 10. For example, materials such as glass, polyethylene, flint glass, or quartz can be placed in the reservoir 10 between the direct path from the source 500 to the detector 502 to selectively refract the electromagnetic radiation from the source 500 depending upon the lubricating fluid level and the lubricating fluid's refractive index.

Alternatively, no materials, such as glass, need be placed in the reservoir 10 to create a fluid-medium refractive interface if the fluid-air interface at the surface of the lubricating fluid is sufficiently stabile or motionless. In such a configuration, a highly directive ray from the electromagnetic source 500, aimed upward toward the fluid-air interface, at an appropriate angle for total internal reflection within lubricating fluid produces a reflected ray toward the detector 502 when the fluid level is at the first fluid level 510. In contrast, when the fluid level is at the second fluid level 512, the ray from the source 500 will continue in an upward direction undetected because the fluid-air interface is absent and internal reflection cannot occur. A highly directive electromagnetic source 500, such as a the combination of a semiconductor laser and a lens, is desirable to achieve controllable total internal reflection.

The electromagnetic source 500 comprises a semiconductor laser, a laser, a lamp, an incandescent lamp, a halogen lamp, a gas-discharge lamp, a light-emitting diode, or the like. In addition, the electromagnetic source 500 may comprise a window in the reservoir 10 or a path for ambient light to enter the reservoir 10. The detector 502 comprises a photoresistor, a cadmium sulfide photoresistor, a solar cell, a photodetector, a phototransistor, a photodetector semiconductor, or the like. Switch 504 comprises a relay, a silicon controlled rectifier (SCR), a triac, a "solid state relay," an optically coupled switch, or the like. The switch 504 is coupled to the detector 502 and the switch 504 is responsive to the detector 502. The alarm 508 and drive motor 506 are illustrated as dashed lines because, the alarm 508 and the drive motor 506 are optional devices which may be selected in accordance with the individual user's preferences. The alarm 508 may comprise a aural warning device or a visual indication device for pump operators, maintenance workers, or other industrial workers. The switch 504 may provide a contact closure or a logic value to activate and deactivate the alarm 508. Various alarms which are suitable for alarm 508 are available through Federal Signal Corporation, 1415 West 22nd St., Hinsdale, Ill. 60521.

Referring to FIG. 12, the electromagnetic source 500 comprises a source resistor 516 and a light-emitting diode 524; the detector 502 comprises a photoresistor 526 and a detector resistor 518; and the switch 504 comprises a transistor driver 20 and a relay 522.

Electrical energy is applied to a power terminal 514. The source resistor 516 limits the current supplied to the light-emitting diode 524. If the photoresistor 526 receives adequate electromagnetic radiation (i.e. light) from the light-emitting diode 524, the resistance of the photoresistor 526 decreases and the voltage applied to the transistor driver 520 increases. The photoresistor 526 and the detector resistor 518 form a voltage dividing network from which the detector 502 provides a variable voltage to the transistor driver 520. Once activated by a sufficient voltage from the voltage dividing network, the transistor driver 520, in turn, provides current to activate the solenoid of a relay 522. As illustrated the relay preferably has form C contacts.

In practice, the relay have normally closed contacts, normally open contacts. The relay may comprise a multiple-pole, multiple-throw relay for the simultaneous switching and controlling of a plurality of devices, such as an alarm, a drive motor, and an automatic valve. In situations where a logic level output is desired, the relay 522 may be rendered unnecessary and the switch 504 would merely include the transistor driver 520.

The light-emitting diode 524 and the photoresistor 526 are preferably placed beneath the first fluid level 510 as shown in FIG. 11. If the level of an opaque lubricating fluid drops to the second fluid level 512, then the transistor driver 520 is activated. The transistor driver 520 energizes the solenoid of relay 522; hence, the user may be alerted via output contacts 527. In contrast, if the fluid level of an opaque lubricating fluid remains at the first fluid level 510, then the transistor driver 520 remains inactive; hence, the solenoid of the relay 522 is not energized.

FIG. 13 illustrates a more elaborate detection means 503 than the detection means 501 of FIG. 11. The detection means 503 of FIG. 13 comprises at least one electromagnetic source 500, a first detector 530, a second detector 532, a logic circuit 534, and a switch 504. The first detector 530 and the second detector 532 each comprise a photoresistor, a solar cell, a phototransistor, a photosensitive semiconductor, or the like.

The logic circuit 534 comprises a logic device, a logic gate, a comparator, or the like. Numerous methods exist to implement the logic circuit 534. For example, an operational amplifier, discrete semiconductors, an integrated circuit, or a commercially available logic gate (i.e. a TTL or CMOS gate) may be used to implement the logic circuit 534. Logic devices include an AND gate, an OR gate, a NOT gate, a NOR gate, and a NAND gate.

The logic circuit 534 preferably includes an interface for the conversion of an analog input to a digital logic input. For example, if a CMOS (complementary metal oxide semiconductor) logic device were used a series resistor between an analog input source and the CMOS input could provide the necessary interface. A transistor in a grounded-emitter switching configuration may also be used for interfacing between an analog input and the input of a logic device. The analog input source is coupled to the base of the transistor and the collector of the transistor is coupled to the logic device input and a "pull-up" resistor. Similarly, a MOSFET (metal-oxide-semiconductor field effect transistor may be used in a grounded-source configuration to interface an analog source to an input of a logic device as is well known to one of ordinary skill in the art.

The switch 504 preferably comprises a "solid state relay." The switch 504 may also comprise a transistor, a semiconductor, a relay, a solenoidal relay, a silicon controlled rectifier (SCR), a triac, or the like. As illustrated by the dashed lines in FIG. 13, the switch 504 is optionally coupled to an alarm 508, a drive motor 506 of a centrifugal pump, or both the alarm 508 and the drive motor 506.

The electromagnetic source 500 may be coupled to the first detector 530, the second detector 532, or both the first detector 530 and the second detector 532, via electromagnetic radiation. The first detector 530 and the second detector 532 are coupled to the logic circuit 534. The logic circuit 534 is coupled to the switch 504.

FIG. 14 illustrates a detection means 503 wherein the logic circuit 534 includes a first comparator 544, a second comparator 546, and an logic gate 552. In addition, FIG. 14 illustrates the switch 504 wherein the switch comprises a "solid state relay." FIG. 14 provides redundancy in that both the first detector 530 and the second detector 532 must be activated by electromagnetic radiation from the source 500 for a high logic level to appear at the output of the logic gate 552.

The first detector 530 is coupled to the noninverting input of the first comparator 544 via a voltage divider formed by the first detector 530 in conjunction with a first detector resistor 540. A first adjustable resistive divider 536 applies an adjustable reference voltage to the inverting input of the first comparator 544. Adjusting the reference voltage determines the sensitivity of the first detector 530 to electromagnetic radiation from the source 500. The first comparator 544 preferably has an open collector output with a grounded emitter so that a first comparator interface resistor 548 assists in providing the necessary logic level to input of the logic gate 552. The first comparator interface resistor 548 is coupled to the logic level input 551. The voltage level applied to the logic level input 551 may be determined by the semiconductor family (i.e. TTL or CMOS) to which the logic gate 552 belongs.

The second detector 532 is coupled to the noninverting input of the second comparator 546 via a voltage divider formed by the second detector 532 in conjunction with a second detector resistor 542. A second adjustable resistive divider 538 applies an adjustable reference voltage to the inverting input of the second comparator 546. Adjusting the reference voltage determines the sensitivity of the second detector 532 to electromagnetic radiation and helps to compensate for ambient light. The second comparator 546 preferably has an open collector output with a grounded emitter so that a second comparator interface resistor 550 assists in providing the necessary logic levels to input of the logic gate 552.

The logic gate 552 is coupled to the control circuit 554 of the switch 504. The control circuit 554 includes a current limiting resistor 562 and a light-emitting diode 560. The light emitting diode 560 is activated by a high logic level from the logic gate 552. If activated, the light emitting diode 560 energizes the switching circuit 556 via a phototransistor 564. The phototransistor 564 provides biasing energy to triac 566 so that the triac 566 may conduct alternating current through output 555. Power is supplied to the phototransistor 564 at a power input 553 via a current limiting resistor 561. One or more silicon controlled rectifiers could be substituted for the triac 566.

FIG. 15 illustrates a detection means 501 wherein the first detector 530 and the second detector 532 comprise phototransistors and wherein the logic circuit 534 utilizes an OR gate 580. The detection means 503 of FIG. 15 may be used to provide an indication if the level of fluid in the reservoir 10 either increases or decreases.

Referring to FIG. 15, if sufficient electromagnetic radiation is incident upon the first detector 530, the first logic driver transistor 576 is activated. In contrast, if electromagnetic radiation is not incident upon the second detector 532, or if the second detector 532 is placed in darkness, the second logic driver transistor 578 is activated. The sensitivity of the first detector 530 is controlled by the first potentiometer 572. The sensitivity of the second detector 532 is controlled by the second potentiometer 574.

If the first detector 530 is placed below the normal lubricating fluid level and if the second detector 532 is illuminated by the source 500 and placed above the normal fluid level, then the output of the OR gate 580 will normally be low logic level. If, however, a seal or containment device fails and the fluid level increases from the normal level, then the output of the OR gate 580 will be forced into a high state because the second detector 532 will raise the potential applied to the base of the second logic driver transistor 578 to turn on the second logic driver transistor 578 because the first detector 530 will be illuminated by the source 500. Hence, the OR gate 580 will receive a high logic level from the second logic driver transistor 578.

If the level of fluid drops below the normal fluid level, then the first detector 530 will provide a current path to the first logic driver transistor 576 to turn on the first logic driver transistor 576. Hence, the first logic driver transistor 576 will provide the OR gate 580 with a high logic level and the output of the OR gate 580 will be a high logic level.

If the output of the OR gate 580 goes into a high state because of a change in the lubricating fluid level, then logic output resistors 582 limit the current to relay driver transistor 584. The high logic level output of the OR gate 580 turns on relay driver transistor 584, which in turn, energizes a solenoid 586. An output 588 may be coupled to a drive motor, an alarm, an automatic valve, a paging device, a phone dialer, or the like.

Method for Detecting Leaks in a Fluid Pump

Figure 16:
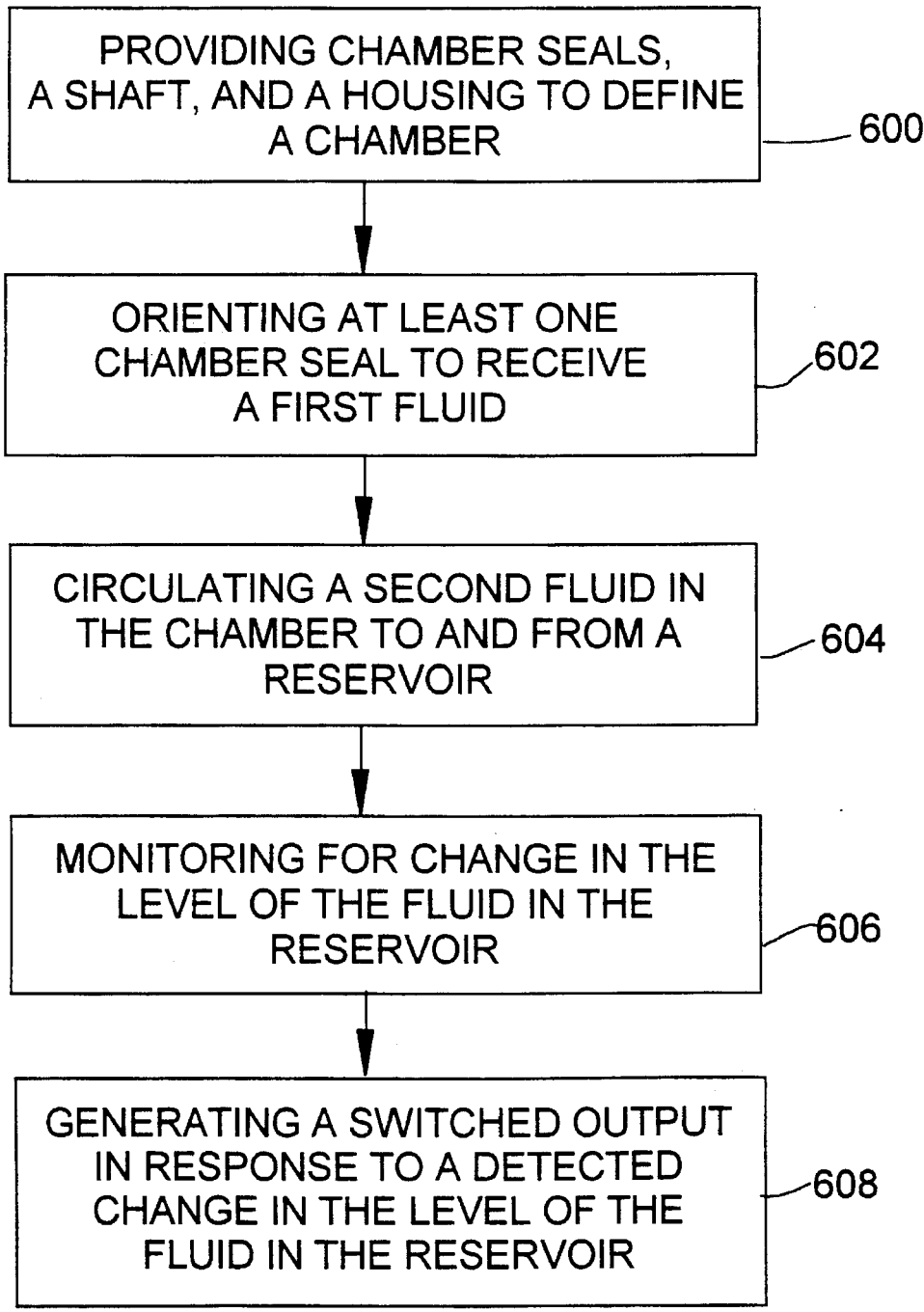
FIG. 16 shows a flow chart of the method for detecting leaks in fluid pumps.

FIG. 16 illustrates the method for detecting leaks in a fluid pump using a fluid containment device, such as a shaft seal or a containment shell. Referring to the step in block 600, chamber seals, a shaft, and a housing are provided to define a chamber and a hydraulic pump. The chamber may be formed in accordance with any of the seal assembly embodiments previously described in the specification. For example, the chamber may be formed as illustrated in FIG. 1 in conjunction with FIG. 4. In practice, the shaft provided, such as shaft 302 of FIG. 1, is the drive shaft of a drive motor for the fluid pump, which is coupled to the housing.

In the step of block 602, the chamber that was formed in block 600 is oriented so at least one chamber seal (i.e. the first seal) potentially receives a first fluid upon failure of leakage of a primary sealing device, or pumped fluid. Orienting the chamber involves positioning the chamber in series with the primary sealing device of the fluid pump so that at least one chamber seal (i.e. the first seal) is a secondary seal. For example, as illustrated in FIG. 9 the seal assembly is attached to the casing 400 via a second gasket 446; the seal assembly is located in series with the containment shell 410. Hence, if the containment shell fails 410, the first fluid will contact the first seal 200. In other words, the chamber seal (i.e. first seal) will receive the first fluid (i.e. pumped fluid).

In the step of block 604, a second fluid, such as a lubricating fluid, is circulated in the chamber to and from a reservoir. The second fluid is circulated by a hydraulic pump. The hydraulic pumps comprises an internal vane pump, an external vane pump, a flexible impeller vane pump, a rotary pump, the combination of the sleeve 300 and the first curved protrusion 104, or the like.

In block 606, the fluid level of the first fluid, the second fluid, or both the first fluid and the second fluid in the reservoir is monitored. The fluid level may be monitored manually by visually displaying the fluid level in the reservoir through a window or a transparent portion of the reservoir. Alternatively, the fluid level could be monitored manually by positioning a dip stick within the reservoir.

The fluid level may be automatically monitored by various embodiments of the optoelectronic leak detectors described in the specification. In general, monitoring the fluid level is accomplished by detecting the electromagnetic propagation of infrared and visible light after the electromagnetic propagation is intentionally arranged to be affected by different levels of fluid in the reservoir. Attenuation, refraction, or reflection of electromagnetic radiation may be used so that the amplitude of the electromagnetic radiation received at a detector varies with level of the fluid in the reservoir. For example, in the presence of a substantially opaque second fluid in the reservoir, visible light and infrared light generated by an electromagnetic source are attenuated. In the absence of the opaque second fluid in the reservoir, visible and infrared light from the electromagnetic source are not attenuated.

In block 608, if a change in the fluid level was detected pursuant to the monitoring in block 606 a switched output is optionally generated. A change in amplitude of electromagnetic radiation received at the detector is used to control a switching circuit so that a user can activate an alarm, reroute the first fluid, or turn off the fluid pump in response to a change in a fluid level of the reservoir. The method for detecting leaks in a fluid pump should be carried out with reference to the information provided throughout the entire specification, including all of the appended drawings.

The foregoing detailed description is provided in sufficient detail to enable one of ordinary skill in the art to make and use the seal assembly; carry out the method for detecting leaks in a fluid pump. The foregoing detailed description is merely illustrative of several physical embodiments of the seal assembly. Physical variations of the seal assembly, not fully described in the specification, are encompassed within the purview of the claims. Accordingly, the narrow description of the elements in the specification should be used for general guidance rather than to unduly restrict the broader descriptions of the elements in the following claims.

We claim:

1. A seal assembly comprising:

a housing having a hollow section, a first channel, and a second channel, the hollow section defined by a surface having a first curved protrusion, the first channel extending radially from the hollow section, and the second channel extending radially from the hollow section;

a shaft extending through the hollow section, the shaft having a predetermined clearance between the first curved protrusion and the shaft;

a first seal, the first seal surrounding a circumferential area of said shaft, the first seal disposed adjacently to said surface;

a second seal, the second seal surrounding a circumferential area of the shaft, the second seal disposed adjacently to said surface; and a reservoir having a reservoir interior, the reservoir coupled to the first channel and the second channel, the reservoir having inspection means for inspecting contents of the reservoir interior.

2. The seal assembly according to claim 1 wherein the shaft is substantially hollow and tubular.

3. The seal assembly according to claim 1 wherein said surface is substantially cylindrical and has an axis; and wherein the seal assembly further comprises a sleeve, the sleeve affixed to said shaft, the sleeve coaxially oriented with respect to said axis, the sleeve operably associated with the first seal and the second seal.

4. The seal assembly according to claim 1 wherein said surface is substantially cylindrical and has an axis; and wherein the hollow section is bounded by a second curved protrusion, the first curved protrusion extending radially inward toward said axis, and the second curved protrusion extending radially inward toward said axis.

5. The seal assembly according to claim 1 further comprising a sleeve affixed to said shaft, the sleeve having a sleeve circumference; and wherein the first curved protrusion defines a first arc, the first arc having a first clearance with respect to said sleeve, and wherein said first channel has a first aperture and said second channel has a second aperture, the first aperture and the second aperture located proximately to said first curved protrusion such that longitudinal axes of the first channel and the second channel are substantially tangential to the sleeve circumference.

6. The seal assembly according to claim 5 wherein said housing has a first face and a second face, the first face having a respective circular groove for engaging a corresponding gasket, the second face having an elevated collar, and the elevated collar coaxially surrounding the hollow section.

7. The seal assembly according to claim 1 wherein each one of the first seal and the second seal comprises a lip seal, the first seal and the second seal being arranged in a seal configuration selected from the group consisting of a tandem seal arrangement, a dual seal arrangement, and a double seal arrangement.

8. The seal assembly according to claim 7 further comprising a third seal located adjacently to the first seal, the third seal being selected from the group consisting of a mechanical seal, a spring-biased mechanical seal, a magnetically biased seal, a lip seal, and mechanical face seals.

9. The seal assembly according to claim 1 wherein the first seal comprises a lip seal having a first frame, an alpha annular hydrodynamic element, a beta annular hydrodynamic element, and a wedge, the alpha annular hydrodynamic separated from the beta annular hydrodynamic element by the wedge, the alpha annular hydrodynamic element and the beta annular hydrodynamic element having orthogonal cross sections oriented for sealing in opposite directions, the first frame operably affixed to the alpha annular hydrodynamic and the beta annular hydrodynamic element; and wherein the second seal comprises a lip seal having a second frame, and a delta annular hydrodynamic element, the second frame operably affixed to the delta annular hydrodynamic element.

10. The seal assembly according to claim 9 further comprising a retainer; and wherein the housing has an elevated collar, a collar interior, and a retainer channel located in the collar interior; the second seal secured by the retainer and the retainer being attached to said housing by the retainer channel.

11. The seal assembly according to claim 1 wherein the shaft has a sleeve and the hollow section is bounded by a cam surface, the cam surface being formed by the first curved protrusion and a second curved protrusion, the cam surface having a closer clearance to the sleeve at the first curved protrusion than at the second curved protrusion, the sleeve having radial cavities, each one of said radial cavities engaging a corresponding vane spring and an associated vane, the vane spring allowing axial movement of its associated vane and the vane spring biasing its associated vane against the cam surface.

12. The seal assembly according to claim 1 wherein a first conduit and a second conduit couple the first channel and the second channel, respectively, from the hollow section to the reservoir.

13. The seal assembly according to claim 12 wherein the first conduit has a heat sink operably associated with the first conduit.

14. The seal assembly according to claim 1 wherein the inspection means comprises a fluid level gauge.

15. The seal assembly according to claim 1 wherein the inspection means comprises a fluid level gauge selected from the group consisting of a window in the reservoir, a substantially transparent reservoir, a substantially translucent reservoir, a reservoir with a substantially translucent portion, and a reservoir with a substantially transparent portion.

16. A seal assembly comprising:

a housing having a hollow section, a first channel, and a second channel, the hollow section defined by a substantially cylindrical surface having a first curved protrusion, the first channel extending radially from the hollow section, and the second channel extending radially from the hollow section;

a shaft extending through the hollow section, the shaft having a predetermined clearance between the first curved protrusion and the shaft;

a first seal, the first seal surrounding a circumferential area of said shaft, the first seal disposed adjacently to said cylindrical surface;

a second seal, the second seal surrounding a circumferential area of the shaft, the second seal disposed adjacently to said cylindrical surface; and a reservoir having a reservoir interior, the reservoir coupled to the first channel and the second channel, the reservoir being associated with detection means for detecting a leak in a fluid containment device.

17. The seal assembly according to claim 16 wherein the detection means comprises an electromagnetic source, a detector, and a switch, the electromagnetic source producing electromagnetic radiation, the detector responsive to the electromagnetic radiation generated by said electromagnetic source if a level of fluid in the reservoir changes, the switch coupled to the detector and responsive to the detector, the switch providing an output for control of an external device.

18. The seal assembly according to claim 17 wherein the external device comprises an alarm.

19. The seal assembly according to claim 17 wherein the external device comprises a fluid pump.

20. The seal assembly according to claim 16 wherein the detection means comprises an optoelectronic leak detector.

21. The seal assembly according to claim 16 wherein the detection means comprises an electromagnetic source, a first detector, a second detector, a logic circuit, and a switch, the first detector positioned in the reservoir interior, the second detector positioned in the reservoir interior, an input of the logic circuit coupled to the first detector and the second detector, the switch coupled to the logic circuit and responsive to an output of the logic circuit, the switch providing switching for the control of an external device selected from the group consisting of a centrifugal pump, an alarm, and an automatic valve.

22. The seal assembly according to claim 21 wherein the logic circuit comprises a logic device selected from the group consisting of a comparator, an AND gate, a NAND gate, a NOR gate, and an OR gate.

23. The seal assembly according to claim 21 wherein the switch comprises a switch selected from the group consisting of a relay, a solid state relay, a solenoidal relay, an optoelectronically controlled relay, a triac, and an optoelectronically controlled triac.

24. A fluid pump coupled to a drive shaft wherein the improvement comprises:

a housing having a hollow section, a first channel, and a second channel, the drive shaft having a sleeve coaxially extending through the housing, the hollow section being bounded by a first curved protrusion and a substantially cylindrical surface, the housing secured to the fluid pump;

a first seal, the first seal surrounding a circumferential area of said sleeve, the first seal adjoining said hollow section;

a second seal, the second seal substantially surrounding a circumferential area of said sleeve, the second seal adjoining said hollow section; and a reservoir, the first channel and the second channel coupling the hollow section to the reservoir.

25. The fluid pump of claim 24 further comprising detection means for detecting a leak in a fluid containment device selected from group consisting of the first seal and the second seal, the detection means associated with the reservoir.

26. The fluid pump of claim 24 further comprising inspection means for inspecting the reservoir, the inspection means associated with the reservoir.

27. The fluid pump of claim 24 wherein the fluid pump is selected from the group consisting of a centrifugal pump, a canned motor pump, a magnetic-drive centrifugal pump, a synchronous magnetic-drive centrifugal pump, and a nonsynchronous magnetic-drive centrifugal pump.

28. A centrifugal pump comprising:

a casing, the casing having an inlet opening, an outlet opening, and a casing interior;

an impeller located in the casing interior;

a pump shaft, the impeller operably engaging the pump shaft;

a first magnet, the first magnet coupled to the impeller such that the first magnet and the impeller rotate simultaneously;

a second magnet, the second magnet coaxially oriented with respect to the first magnet, the second magnet permitting coupling to a drive shaft means;

a containment shell oriented between the first magnet and the second magnet;

a seal assembly having a housing, a first seal, a second seal, and a reservoir; the housing having a hollow section, a first channel, and a second channel, the housing secured to the casing, the drive shaft means extending through the hollow section, the first seal and the second seal operably engaging the hollow section, the hollow section coupled to the reservoir via the first channel and the second channel, the hollow section having its boundaries defined by a curved surface, varied radial clearances separating the drive shaft means from the curved surface.

29. The centrifugal pump according to claim 28 wherein the first magnet comprises an inner magnet assembly; and wherein the second magnet comprises an outer magnet assembly, the inner magnet assembly coaxially disposed within the outer magnet assembly.

30. A method for detecting leaks in a centrifugal pump using a first fluid containment device wherein the first fluid containment device comprises a containment shell that confines a first fluid, the method comprising the steps of:

a) providing a housing, a shaft, and chamber seals to define a chamber containing the shaft;

b) orienting at least one of said chamber seals to receive the first fluid if the first fluid containment device leaks the first fluid;

c) circulating a second fluid in the chamber to and from a reservoir; and d) monitoring for a change in the level of the second fluid in the reservoir and monitoring for the presence of the first fluid in the reservoir to determine the integrity of the first fluid containment device.

31. The method of claim 30 wherein step d comprises: simultaneously monitoring for changes in the level of the first fluid and the second fluid in the reservoir.

32. The method according to claim 30 wherein orienting at least one chamber seal in step b is accomplished by providing a path for the first fluid to migrate into the chamber from the fluid pump.

33. The method according to claim 30 further comprising the step of:

e) selecting a particular one of said chamber seals to allow the introduction of the first fluid into the chamber when a predetermined pressure at said particular chamber seal is exceeded.

34. The method according to claim 30 wherein step d is accomplished by generating electromagnetic radiation and detecting changes in electromagnetic radiation attenuation caused by a change in level of a substantially opaque second fluid.

35. The method according to claim 30 further comprising the step of:

e) generating a switched output in response to a change in the level of the fluid in the reservoir.

36. The method according to claim 30 further comprising the step of:

e) visually displaying a level of the second fluid in said reservoir.

37. The method of claim 30 further comprising the step of:

e) cooling the second fluid.

38. The method according to claim 30 further comprising the step of:

e) generating an alarm in response to a change in level of the second fluid in the reservoir.

39. The centrifugal pump according to claim 28 wherein said varied radial clearances comprise a minimum clearance region and a maximum clearance region; the minimum clearance region ranging from approximately fifteen thousandths of an inch to approximately forty thousandths of an inch.

40. The centrifugal pump according to claim 28 wherein the curved surface includes a protrusion defining an arc ranging from 120 continuous degrees to 145 continuous degrees, the arc having a contour corresponding to a circumference of the drive shaft means.

41. The centrifugal pump according to claim 28 wherein the first channel has a first longitudinal axis and the second channel has a second longitudinal axis, and wherein the first longitudinal axis and the second longitudinal axis extend tangentially relative to a circumference of the drive shaft means.

42. The centrifugal pump according to claim 28 wherein said first channel has a larger cross-section than said second channel.

43. The centrifugal pump according to claim 28 wherein the first seal comprises a first single-lip seal and wherein the second seal comprises a second single-lip seal.

44. The centrifugal pump according to claim 28 wherein the first seal comprises a dual-lip seal having bi-directional sealing ability and wherein the second seal comprises a single-lip seal; the first seal being oriented closer toward the containment shell than the second seal is oriented.

45. The centrifugal pump according to claim 44 wherein the first seal has at least one substantially annular hydrodynamic element substantially constructed from polytetrafluoroethylene; and wherein the second seal has a substantially annular hydrodynamic element substantially constructed from polytetrafluoroethylene.

46. The centrifugal pump according to claim 28 wherein the reservoir has a fluid level gauge.

47. The centrifugal pump according to claim 28 wherein the reservoir has a substantially transparent portion.

48. The centrifugal pump according to claim 28 wherein the reservoir is substantially transparent or substantially translucent.

49. The centrifugal pump according to claim 28 further comprising:

a fluid located in the reservoir, the fluid having a fluid level;

detection means for detecting potential leakage of the containment shell; the detection means being associated with said reservoir, the detection means monitoring for a predefined change in said fluid level.

50. The centrifugal pump according to claim 49 wherein said detection means comprises an electromagnetic source, a detector, and a switch; the electromagnetic source generating electromagnetic radiation, the detector spatially oriented to receive a first amplitude of electromagnetic radiation from the electromagnetic source if the fluid is at a first fluid level and the detector spatially oriented to receive a second amplitude of electromagnetic radiation from the electromagnetic source if the fluid is at a second fluid level, an amplitude change between said first amplitude and said second amplitude received by said detector being indicative of a corresponding change in the fluid level, the switch coupled to said detector, the switch being responsive to said detector.

51. The centrifugal pump according to claim 50 wherein the detector comprises an optical detector selected from the group consisting of a photoresistor, a cadmium sulfide photoresistor, a solar cell, a photodetector, a phototransistor, and a photodetector semiconductor.

52. The centrifugal pump according to claim 50 further comprising:

an alarm, the alarm connected to said switch, wherein the switch activates the alarm in response to the predefined change in said fluid level.

53. The centrifugal pump according to claim 50 further comprising:

a drive motor, the drive motor mechanically coupled to said drive shaft means, wherein the switch is coupled to the drive motor, the switch deactivating the drive motor in response to the predefined change in said fluid level.

54. The centrifugal pump according to claim 28 wherein the drive shaft means comprises a combination of a drive shaft and a sleeve, the drive shaft coaxially surrounded by the sleeve; and wherein said varied radial clearance actually separates the sleeve from the curved surface.

55. The centrifugal pump according to claim 28 further comprising:

a first fluid located in the casing interior, the containment shell being oriented adjacent to the casing interior to substantially confine said first fluid; and a second fluid located in the reservoir and in the hollow section, the first seal and the second seal substantially confining the second fluid to the hollow section and to the reservoir, such that upon rotational movement of the drive shaft means the second fluid is circulated to and from the reservoir.

* * * * *